(12) United States Patent
Ai et al.

(10) Patent No.: US 12,038,919 B2
(45) Date of Patent: Jul. 16, 2024

(54) SYSTEM MODELS THAT SUPPORT THE TRACEABILITY OF ACTIVITIES

(71) Applicant: SAP SE, Walldorf (DE)

(72) Inventors: Zhijie Ai, Shanghai (CN); Shihui Chen, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/998,831

(22) Filed: Aug. 20, 2020

(65) Prior Publication Data
US 2022/0058189 A1 Feb. 24, 2022

(51) Int. Cl.
| G06F 16/242 | (2019.01) |
| G06F 9/54 | (2006.01) |
| G06F 16/22 | (2019.01) |
| G06F 16/2455 | (2019.01) |
| G06F 16/248 | (2019.01) |

(52) U.S. Cl.
CPC ............ *G06F 16/244* (2019.01); *G06F 9/541* (2013.01); *G06F 16/2282* (2019.01); *G06F 16/2455* (2019.01); *G06F 16/248* (2019.01)

(58) Field of Classification Search
None
See application file for complete search history.

(56) References Cited

U.S. PATENT DOCUMENTS

| 5,553,279 A * | 9/1996 | Goldring | G06F 16/2358 |
| | | | 714/E11.13 |
| 6,725,287 B1 | 4/2004 | Loeb et al. | |
| 6,980,988 B1 * | 12/2005 | Demers | G06F 11/2082 |
| 8,321,433 B1 | 11/2012 | Klinker et al. | |
| 8,730,815 B2 * | 5/2014 | Sanguineti | H04L 41/0226 |
| | | | 370/467 |
| 9,152,398 B2 | 10/2015 | Schreter | |
| 9,740,582 B2 | 8/2017 | Eluri et al. | |
| 9,792,002 B2 | 10/2017 | Bhandarkar et al. | |
| 9,804,935 B1 * | 10/2017 | Holenstein | G06F 11/1469 |
| 10,581,851 B1 * | 3/2020 | File | G06N 20/00 |

(Continued)

OTHER PUBLICATIONS

SAP Blogs, "New Enhancements in Service Packs of SAP Sourcing/CLM 9.0 Release," Oct. 30, 2012 (Year: 2012).*

(Continued)

*Primary Examiner* — Yu Zhao
(74) *Attorney, Agent, or Firm* — Klarquist Sparkman, LLP

(57) ABSTRACT

Systems and processes for recording operational activities in a traceable manner are provided herein. Event data for events associated with operational activities may be received at a system, the event data including, for each of the events, a time parameter and a subject of the respective event. The events may be grouped and processed according to the time parameter or the subject of each of the events, and one or more database tables of a model may be populated and/or updated with event entries based on the event data. The model may include a first part corresponding to processing of the operational activities, and a second part corresponding to results of the processing of the operational activities, where event entries stored in the first and second parts of the model are linked by respective process dates for the event entries. The tables may be output for presentation to a user.

19 Claims, 13 Drawing Sheets

(56) References Cited

U.S. PATENT DOCUMENTS

| | | | |
|---|---|---|---|
| 2001/0056500 A1* | 12/2001 | Farber | H04L 67/1006 |
| | | | 707/E17.119 |
| 2002/0038228 A1 | 3/2002 | Waldorf et al. | |
| 2003/0133552 A1 | 7/2003 | Pillai et al. | |
| 2009/0313309 A1* | 12/2009 | Becker | G06F 16/13 |
| | | | 707/999.203 |
| 2012/0232947 A1 | 9/2012 | McLachlan et al. | |
| 2012/0271867 A1* | 10/2012 | Grossman | G06F 40/197 |
| | | | 707/821 |
| 2014/0279930 A1* | 9/2014 | Gupta | G06F 11/1464 |
| | | | 707/683 |
| 2015/0242431 A1* | 8/2015 | Vlcek | G06Q 50/01 |
| | | | 707/753 |
| 2015/0254158 A1* | 9/2015 | Puri | G06F 11/3476 |
| | | | 714/37 |
| 2016/0179863 A1* | 6/2016 | Chandran | G06Q 10/0637 |
| | | | 707/751 |
| 2017/0208144 A1* | 7/2017 | Zhang | G06F 11/3495 |
| 2019/0303572 A1* | 10/2019 | Chelarescu | G06F 11/1469 |
| 2020/0134750 A1* | 4/2020 | Wolf | H04L 63/0407 |

OTHER PUBLICATIONS

SAP, "SAP Sourcing / SAP CLM 10.0 Functional Enhancements," 2014 (Year: 2014).*

SAP, "Solution Operations Guide Solution Operations Guide for SAP Sourcing 9.0," 2012 (Year: 2012).*

Harveyslash, "Multiple tables entry with current timestamp," Mar. 2, 2016 (Year: 2016).*

* cited by examiner

FIG. 4

| No | Event | Event Detail | Business Date | Effective Date |
|---|---|---|---|---|
| 1 | Create Contract 1 | POB1:SSP=100, PROD=200<br>POB2:SSP=100, PROD=300<br>Source: SD:001 | 4/1 0:00 | 5/1 0:00 |
| 2 | Invoice POB 1 (Contract 1) | POB1: amount=20 on PROD<br>Source: SD:002 | 4/2 0:00 | 5/1 0:00 |
| 3 | Create Contract 2 | POB3: SSP=50, PROD=100<br>POB4: SSP=50, PROD=200<br>Source: SD:003 | 4/3 2:00 | 5/1 0:00 |
| 4 | Fulfill POB 2 (Contract 1) | POB2: amount=50<br>Source: SD:004 | 4/3 0:00 | 5/2 0:00 |
| 5 | Change Contract 1 | POB1: PROD from 200 to 400<br>Source: SD:005 | 4/4 0:00 | 5/2 5:00 |
| 6 | Invoice POB 3 (Contract 2) | POB3: amount=10 on PROD<br>Source: SD:006 | 4/4 3:00 | 5/1 5:00 |
| 7 | Undo Contract 1 | Undo till effective date 5/2 0:00:00 AM (event 4)<br>Source: UI | 4/5 0:00 | 5/3 9:00 |
| 8 | Change Contract 2 | POB4: PROD from 200 to 150<br>Source: SD:007 | 4/6 0:00 | 5/4 5:00 |
| 9 | Change Contract 1 | POB1: PROD from 200 to 250<br>Source: SD:008 | 4/4 0:00 | 5/2 5:00 |
| 10 | Combine | Combine contract 1 to contract 2<br>Source: UI | 4/7 0:00 | 5/5 5:00 |
| 11 | Undo Contract 2 | Undo till effective time 5/1 05:00:00 AM (event 6)<br>Source: UI | 4/7 3:00 | 5/6 5:00 |
| 12 | Invoice POB 4 (Contract 2) | POB4: amount = 30 on PROD<br>Source: SD:009 | 4/7 4:00 | 5/4 8:00 |
| 13 | Redo Event 8 (Contract 2) | Source: UI | 4/7 5:00 | 5/5 10:00 |

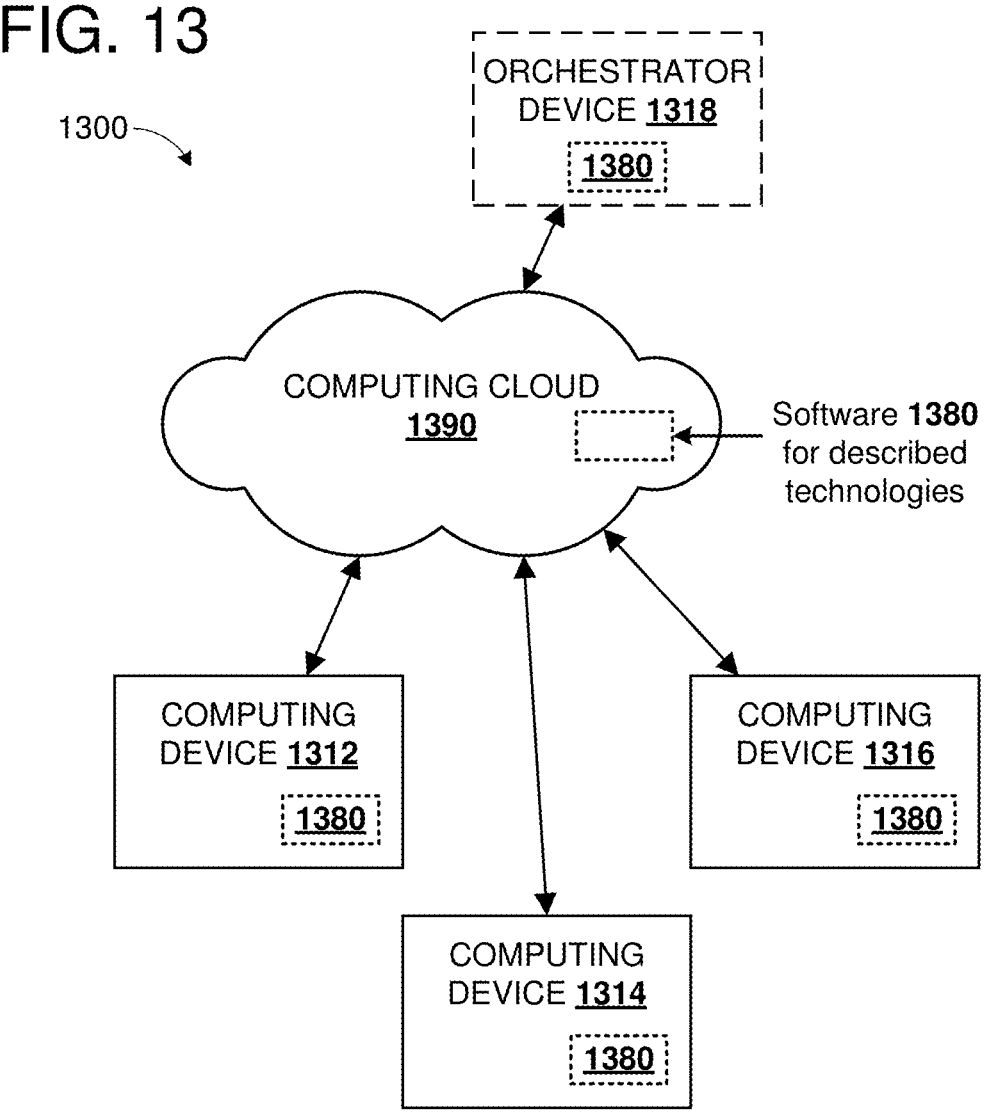

SYSTEM MODELS THAT SUPPORT THE TRACEABILITY OF ACTIVITIES

BACKGROUND

A company or other organization conducts operational activities, which contribute to economic effects of the organization. For example, operational activities may include operating, investing, and financing activities of the organization. Operational activities may be performed according to a workflow in which different events relating to an operational activity may be created, scheduled, and processed at respective times. Data of each operational activity may be recorded for tracking finances and related information for the organization. However, the recording of operational activity information may be disconnected, such that events occurring and/or recorded at different times for a given operational activity are not linked to one another. Accordingly, there remains a need for improved technologies for a workflow of recording operational activities that supports tracing processes of the operational activities through to associated results of the operational activities.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In summary, the detailed description is directed to various innovative technologies for recording operational activities in a traceable manner. In some examples, the disclosed technologies can be implemented as a method performed by a computer. For example, the method may include receiving input of event data for events associated with operational activities, the event data including, for each of the events, a time parameter and a subject of the respective event, grouping and processing the events according to the time parameter or the subject of each of the events, and populating database tables in each of a first part and a second part of a model with event entries based on the event data. The first part of the model may correspond to processing of the operational activities associated with each of the event entries and the second part of the model may correspond to results of the processing of the operational activities associated with each of the event entries, and event entries stored in the first part and the second part of the model may be linked by respective process dates for the event entries. The method may further include outputting one or more of the database tables of the model for presentation to a user.

In some examples, the disclosed technologies can be implemented as computer-readable media storing instructions which, when executed by one or more hardware processors, cause the hardware processors to perform the following actions: receiving, from a data source, event data for an event associated with operational activities of an organization, the event data including a time parameter and a subject of the event, processing the event in accordance with the time parameter of the event, wherein the event is assigned a process date corresponding to a time at which the event is processed, storing the event data and the process date for the event in a first plurality of database tables corresponding to a first, process tracking part of a model and in a second plurality of database tables corresponding to a second, results part of the model, and outputting one or more of the first plurality of database tables for presentation to a user.

In some examples, the disclosed technologies can be implemented in a system including one or more hardware processors with coupled memory, and computer-readable media storing instructions executable by the one or more hardware processors. The instructions include first, second, third, fourth, and fifth instructions. The first instructions, when executed, cause the system to receive event data for a plurality of events associated with operational activities of an organization, the event data including a respective effective date and a respective subject of each event of the plurality of events. The second instructions, when executed, cause the system to perform a batch processing of the plurality of events, wherein the plurality of events are processed in an order that is based on the respective effective dates and the respective subjects of the plurality of events, and wherein each event of the plurality of events is associated with a process date corresponding to a time at which the respective event is processed. The third instructions, when executed, cause the system to store, for each event of the plurality of events, the event data and the process date for the event in a respective entry in each of: a journal table of a first, process tracking part of a model, and a results table corresponding to a second, results part of the model. The fourth instructions, when executed, cause the system to update the journal table and the results table responsive to receiving a request to perform an operation associated with one or more of the events. The fifth instructions, when executed, cause the system to output at least the journal table for presentation to a user.

The foregoing and other objects, features, and advantages of the invention will become more apparent from the following detailed description, which proceeds with reference to the accompanying figures.

BRIEF DESCRIPTION OF THE DRAWINGS

FIG. 4 is an example database table of events relating to operational activities.

FIG. 13 is a diagram schematically depicting computing devices operating in conjunction with a computing cloud for implementation of disclosed technologies.

DETAILED DESCRIPTION

Introduction and Overview

Each operational activity performed by an organization (e.g., a corporation and/or other entity) can contribute to economic effects related to that organization. For example, a goods delivery contributes to costs growth and revenue recognition, and further contributes to the change of financial records. The data of each operational activity may be recorded in a quality financial accounting software, in order to assist accountants, auditors, system administrators, and other professionals with their daily work in tracking and analyzing financial considerations of the organization.

Given that both the process and results of operational activities may be recorded, a workflow that supports tracing back the entire process of operational activities adds value to enterprise resource planning (ERP) products. The following disclosure describes a system model that supports tracing back operational activities. Any system developed based on this model can achieve the traceability of operational activities. The model includes two parts: the first part stores the process of operational activities (e.g., the events that trigger transaction), and the second part stores the results of operational activities. The connection between the two parts is the process date, a timestamp that is specific to a selected precision, such as a millisecond. Therefore, the process (event) and results of operational activities are connected as a time tunnel. The model also supports undoing processes until a specific event and undoing the undo action.

Example Model

Figure 1:
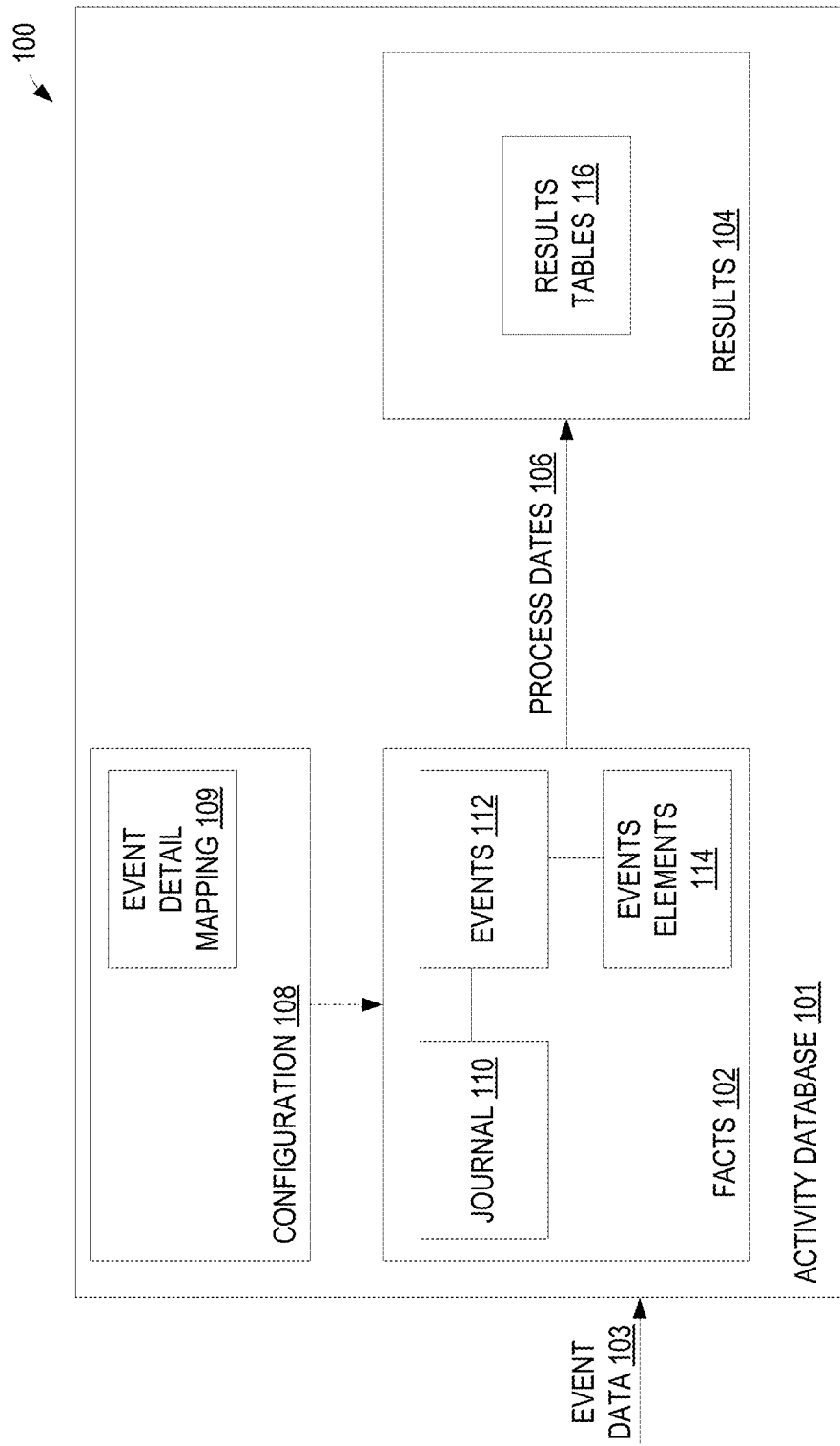
FIG. 1 is a schematic diagram of an example model for tracing operational activities.

FIG. 1 is a schematic diagram of an example model 100 for recording operational activities in a workflow that supports tracing back a process of the operational activities. As described above, in order to support different organization systems, the model 100 stores data in two parts within an activity database 101. The first part stores the data of Facts 102 while the second part stores the data of Results 104, and the two parts are connected by Process Dates of the events as schematically depicted at 106. The model further includes an additional part designated Configuration 108. The data in the Configuration part 108 is used for configuring the location of the data source that corresponds to each event type. The database tables of the model serve to transform the data structure of incoming event data 103 for storage in the activity database 101 to allow for improved tracing and processing of events represented by the event data.

The Facts part 102 of the model 100 stores data in multiple database tables, including one or more journal tables 110, events tables 112, and events elements tables 114, and relates to processes of events tracked by the model. The core database table is the journal table 110, which records all events and related information. For example, the journal table 110 may be populated with at least a portion of the information stored in the events tables 112, and the events tables 112 may be populated with information from the events elements tables 114. The mapping of details between the database tables of the Facts part 102, as well as the mapping of the incoming event data 103 to the database tables of the facts part 102, may be controlled by event detail mapping data 109 of the Configuration part 108. The events are sequenced by process dates. An example journal table format follows:

| ProcessDate | Event No. | Event Type | Event Source | Effective Date |
| --- | --- | --- | --- | --- |

The Process Date field records the time at which an associated event is processed by the system. The field is used for connecting the Facts part 102 with the Results part 104, so the number used in the Process Date field is specific to a selected precision, such as one millisecond. The process date is one of the primary keys, or signatures of the targets of the operational activities, of records in the Results tables, such that the results of the corresponding events are identified by process dates. The process dates are also used to support undo actions, as will be described in more detail below.

The Event Type field may be configured by a user to represent the information about data sources that correspond to different event. For example, the information of different event types may be recorded in different event tables and event elements tables (e.g., using information from the event detail mapping data 109). As a non-limiting example, information of a creation event type may be recorded in a creation event table.

The Event Source field records the source of events.

The Effective Date field records the expected time when an associated event is to take effect. For example, an operational activity may be scheduled to occur at a date/time in the future relative to the time at which the operational activity is created and recorded. Once the scheduled Effective Date arrives, the system processes the event, thus, the associated Process Date of the operational activity may be later than the Effective Date of the operational activity in some examples (e.g., due to computer processing delays).

For complicated operational activities, signatures of operational activities targets may be included in the journal table. As a non-limiting example, a revenue accounting contract may be considered a key in revenue accounting, and may be processed alone (changing a contract) and together with other contracts (combining multiple contracts). Therefore, to support processing multiple organization objects, contract ID, together with software component ID, may be included as one of the primary keys in the journal table for such an example (e.g., where different component IDs may target different sets of Facts and Results tables). The signature of the operational activities targets may be a related ID or a processed UUID coming from multiple primary keys of organization objects, and a journal table with a common ID as the signature of objects may result in a table that includes more than one objects. Furthermore, additional fields may be included in the journal table, such as component, package, etc.

The Results part 104 includes Results tables 116, which may have a simpler structure than the database tables for the Facts part 102, and relates to results of performing processes associated with the events (e.g., results of performing an action to process an event, such as creating a contract, fulfilling a contract, invoicing a contract, undoing/redoing events, etc.). For example, the primary keys of the Results tables 116 may include process date and keys of operational activities. After events are processed, each event may be attributed with only a process date, which is recorded in both the Facts tables and the Results tables. Therefore, for each Results table 116 in the Results part 104, the process date is used as one of the primary keys.

In order to support the traceability of operational activities, the complete information of each process including facts and results are recorded. In one example of the data model, the insertion of actions is supported, but updating actions in the database tables is not supported. Since the process date is one of the primary keys, the support of only insert actions increases reliability of the model, as this prevents system errors that may arise if primary keys are repeated.

In order to reduce the number of the times the system reads data, the data model may only record delta changes. In such examples, only the changed data is recorded in the database tables. As a non-limiting, illustrative example, if a performance obligation (POB) operational activity has multiple condition types, when a POB is changed, only one condition type is changed. Therefore, in this example, the system only records the change to this condition type, while other unchanged condition types are not updated. When the system reads data, it captures the latest image data of all alive entries according to primary keys.

In an illustrative example of a Results table (e.g., an example of a Results table 116) as follows in Table 1, process date, POB ID, and condition type are the primary keys of the database table. POB1/PR00 has two process dates in the first and sixth records. POB2/PR00 has two process dates in the third and fifth records. That means two events are processed both for POB1/PR00 and POB2/PR00. When the system reads data, it captures the record of the latest process date of each POB. Therefore, it reads the second record for POB1/CORR, the fourth record for POB2/CORR, the fifth record for POB2/PR00, and the sixth record for POB1/PR00. The first record for POB1/PR00 and the third record for POB2/PR00 are not read because they are the results of the last event. It is also seen from the database table that the latest event only takes effect on POB1/PR00 and POB2/PR00.

TABLE 1

Example Results Table for a Results part of a system model.

| No | ProcessDate | PobId | Cond Type |
|----|-------------|-------|-----------|
| 1 | June 10 5:00 | POB1 | PR00 |
| 2 | June 10 5:00 | POB1 | CORR |
| 3 | June 10 5:00 | POB2 | PR00 |
| 4 | June 10 5:00 | POB2 | CORR |
| 5 | June 10 5:02 | POB2 | PR00 |
| 6 | June 10 5:03 | POB1 | PR00 |

Example Scenario: Creating a Revenue Accounting Contract

The following example describes how a model according to the present disclosure, such as model 100 of FIG. 1, may be used to record and trace back operational activities, using a revenue accounting contract and associated non-limiting illustrative example parameters.

In this example, a user creates a contract of 100 U.S. dollars in a source deposit on Apr. 1, 2019 and sets an effective date of the contract creation event as May 1, 2019. When the event data is imported from the source deposit to the system, the system records the event in a journal table as shown in Table 2 below:

TABLE 2

Journal Table of Fact part of model

| ProcessDate | Contract Id | Event No | Event Type | Event Source | Effective Date |
|-------------|-------------|----------|------------|--------------|----------------|
| | | 1 | Contract Creation | SD | May 1 0:00 |

Since the event type in this example is contract creation, the event type is configured to read the contract event table of the Facts part. Therefore, a record was created in the contract event table as shown in Table 3 below:

TABLE 3

Contract Event Table of Fact part of model

| Event No | Contract Id | Price |
|----------|-------------|-------|
| 1 | | $100 |

The system reads the unprocessed event and processes the contract creation event on May 1, 2019, which was designated as the effective date. The process date for this action is 2019/5/1 00:01 (e.g., 12:01 am on May 1, 2019) and the contract ID was created as 1000. The Facts tables are correspondingly updated as shown in Tables 4 and 5 below and a Results table is updated as shown in Table 6 below:

TABLE 4

Updated Journal Table of Fact part of model

| ProcessDate | Contract Id | Event No | Event Type | Event Source | Effective Date |
|-------------|-------------|----------|------------|--------------|----------------|
| 2019 May 1 00:01 | 1000 | 1 | Contract Creation | Source Deposit | May 1 0:00 |

TABLE 5

Updated Contract Event Table of Fact part of model

| Event No | Contract Id | Price |
|----------|-------------|-------|
| 1 | 1000 | $100 |

TABLE 6

Results Table of Result part of model

| ProcessDate | Contract Id | Price |
|-------------|-------------|-------|
| 2019 May 1 00:01 | 1000 | $100 |

Accordingly, the detailed information of the contract creation event is listed in the Facts—Journal table as follows: the event type is contract creation, the contract ID is 1000, the prices is 100 U.S. dollars, and the process date is 2019/5/1 00:01. The detailed information of the contract creation event is listed in the Results—Contract Detail table and corresponds to the following: the result of the contract creation event is that on 2019/5/1 00:01, a contract with the contract ID 1000 and the price of 100 U.S. dollars was created.

Example Scenario: Modifying a Revenue Accounting Contract

The following description relates to an example scenario in which the revenue accounting contract created in the above-described scenario is modified. In this example, the user modifies the price of the contract to 200 U.S. dollars (modified from the original 100 U.S. dollar price) in the system on May 2, 2019 at 9 am and set the change to take effect immediately. The Facts—Journal table is updated to record the data of this event. In the configuration table of the data model, the detailed information of the contract change event is recorded in the contract event table. Therefore, the two tables (Facts—Journal table and Facts—Contract Event table) are updated as shown below in Tables 7 and 8.

TABLE 7

Updated Journal Table of Fact part of model

| ProcessDate | Contract Id | Event No | Event Type | Event Source | Effective Date |
|---|---|---|---|---|---|
| 2019 May 1 00:01 | 1000 | 1 | Contract Creation | SD | May 1 0:00 |
| 2019 May 2 09:01 | 1000 | 2 | Contract Change | Manual | May 2 09:00 |

TABLE 8

Updated Contract Event Table of Fact part of model

| Event No | Contract Id | Price |
|---|---|---|
| 1 | 1000 | $100 |
| 2 | 1000 | $200 |

This modification also causes a result of the operational activity (e.g., the result of changing the price of the contract), so the Contract Detail table of the Result part of the model is updated as shown below in Table 9:

TABLE 9

Updated Contract Detail Table of Results part of model

| ProcessDate | Contract Id | Price |
|---|---|---|
| 2019 May 1 00:01 | 1000 | $100 |
| 2019 May 2 09:01 | 1000 | $200 |

Example Scenario: Taking an Undo Action

The following description relates to an example scenario in which the revenue accounting contract created and modified in the above-described scenarios is further modified to take an undo action. An undo action may be regarded as an event in the system. An undo action may be performed in order to undo events up to an entered event number. For example, a user may perform an undo action specifying an event number (e.g., event number 4) and all events until the entered event number may be undone (e.g., if there are 9 total events, events 5-9 may be undone). The user may additionally or alternatively set the effective date (as used herein, the term date may be understood to include any parameter identifying a time, which may include a day and a time of the day) for the undo action. The undo (and redo, as described in more detail below) action may be triggered by an Application Programming Interface (API) or User Interface (UI) call.

Following the above-described scenarios, in this illustrative example, the user specifies to undo Event 2 until Event 1 (e.g., where the events are designated in Table 7) on May 3, 2019 at 9:00 am and set the change to take effect immediately. Accordingly, the Journal table of the Facts part of the model records the data of the event. In the configuration table of the data model, the detailed information of the undo event is recorded in the undo event table. An example of the correspondingly updated Journal table and the Undo Event table are shown below in Tables 10 and 11, respectively:

TABLE 10

Updated Journal table of the Facts part of the model

| ProcessDate | Contract Id | Event No | Event Type | Event Source | Effective Date |
|---|---|---|---|---|---|
| 2019 May 1 00:01 | 1000 | 1 | Contract Creation | SD | May 1 0:00 |
| 2019 May 2 09:01 | 1000 | 2 | Contract Change | Manual | May 2 09:00 |
| 2019 May 3 09:01 | 1000 | 3 | Undo | Manual | May 3 9:00 |

TABLE 11

Undo Event table of the Facts part of the model

| Event No | Contract Id | Undo Till |
|---|---|---|
| 3 | 1000 | 2 |

The system may process the undo event by the following steps. In a first operation, the system gets the target event from the Facts—Undo Event table. In this example, the target event is Event 2 (see Tables 10 and 11). The system then gets the process date of the target event from the Facts—Journal table. The process date is 2019/5/2 09:01. In a second operation, the system finds the last process date that is before the process date of the target event from the Results table and sets it as the target process date. In this example, 2019/5/1 00:01 is the target process date after the undo event. In a third operation, the system saves the target process date and the related data as a new record in the Results table. The process date of the new record is 2019/5/3 09:01 (e.g., since there is no extra calculation within the system, as the system fetches old information and sets it as new, the performance of the undo operation is fast). The corresponding updated Results table is shown below in Table 12:

TABLE 12

Updated Contract Detail table of Results part of model

| ProcessDate | Contract Id | Price |
|---|---|---|
| 2019 May 1 00:01 | 1000 | $100 |
| 2019 May 2 09:01 | 1000 | $200 |
| 2019 May 3 09:01 | 1000 | $100 |

An undo event itself may also be targeted by an undo action. Accordingly, if a user finds that a last undo event is incorrect, the user can undo the incorrect event. An example of such an action is described below, continuing from the previous example scenarios. In this example, the user enters a target event number Event 3 on May 4, 2019 at 10:00 am for an undo action, setting the change to take effect immediately. The system processes the undo event as a general undo event as described in the prior example. Accordingly, in a first operation, the system gets the target event from the Facts—Undo Event table. In this example, the target event is Event 3. The system then gets the process date of the target event from the Facts—Journal table. The process date is 2019/5/3 09:01. In a second operation, the system finds the last process date that is before the process date of the target event from the Results table and sets it as the target process date. In this example, 2019/5/2 09:01 is the target process date after the undo event. In a third operation, the system saves the target process date and the related data as a new record in the Results table. The process date of the new record is 2019/5/4 10:01. The corresponding updated to the Facts and Results tables are as shown in Tables 13-15 below:

TABLE 13

Updated Journal table of the Facts part of the model

| ProcessDate | Contract Id | Event No | Event Type | Event Source | Effective Date |
|---|---|---|---|---|---|
| 2019 May 1 00:01 | 1000 | 1 | Contract Creation | SD | May 1 0:00 |
| 2019 May 2 09:01 | 1000 | 2 | Contract Change | Manual | May 2 09:00 |
| 2019 May 3 09:01 | 1000 | 3 | Undo | Manual | May 3 9:00 |
| 2019 May 4 10:01 | 1000 | 4 | Undo | Manual | May 4 10:00 |

TABLE 14

Updated Undo Event table of the Facts part of the model

| Event No | Contract Id | Undo Till |
|---|---|---|
| 3 | 1000 | 2 |
| 4 | 1000 | 3 |

TABLE 15

Updated Contract Detail table of the Results part of the model

| ProcessDate | Contract Id | Price |
|---|---|---|
| 2019 May 1 00:01 | 1000 | $100 |
| 2019 May 2 09:01 | 1000 | $200 |
| 2019 May 3 09:01 | 1000 | $100 |
| 2019 May 4 10:01 | 1000 | $200 |

First Example Method

Figure 2:
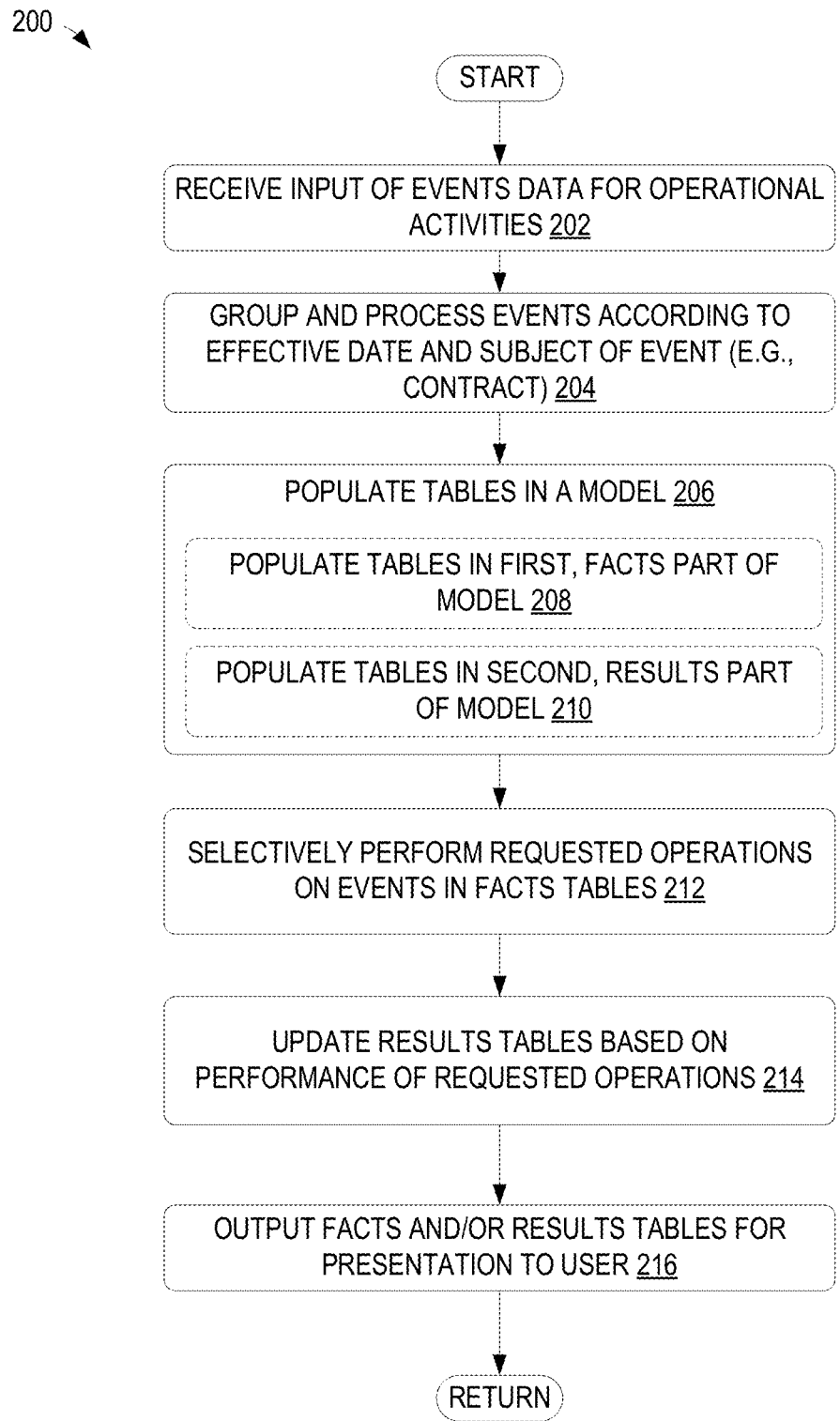
FIG. 2 is a flowchart of an example method of recording traceable operational activities using a two-part model.

FIG. 2 is a flowchart 200 of an example method for tracking an organization's events in a traceable manner. At 202, the method includes receiving input of events data for operational activities. For example, personnel of an organization may input information relating to operational activities, such as the creation, processing, and/or modification of a contract or other event. At 204, the method includes grouping and processing events according to effective date (e.g., the date at which the event is planned to take effect) and subject of event (e.g., all events relating to the same contract may be grouped together).

At 206, the method includes populating tables in a model (e.g., the two-part model 100 of FIG. 1). In this way, the system may transform an input data structure to fit the model. For example, the method may include populating tables in a first, facts part of the model (e.g., relating to processing of the operational activities), as indicated at 208, and populating tables in a second, results part of the model (e.g., relating to results of the processing of the operational activities), as indicated at 210. Examples of the facts and results parts of the model are described above with respect to model 100 of FIG. 1. As described above, the events in the first and second parts of the model may be linked by respective process dates for the events.

At 212, the method includes selectively performing requested operations on events in the facts tables. The requested operations may include undo, redo, combine, and/or other operations to modify existing events in the two-part model, as well as operations to add new events to the two-part model. The requested operations may be requested by a user and/or otherwise received via an API or UI call. It is to be understood that the requested operations may include additional operations performed in response to user-requested operations (e.g., a user-requested undo operation on one contract may trigger an automatic undo operation on another contract in some examples, such as examples where the contracts are combined prior to performing the undo operation). At 214, the method includes updating the results tables based on the performance of the requested operations.

Figure 3:
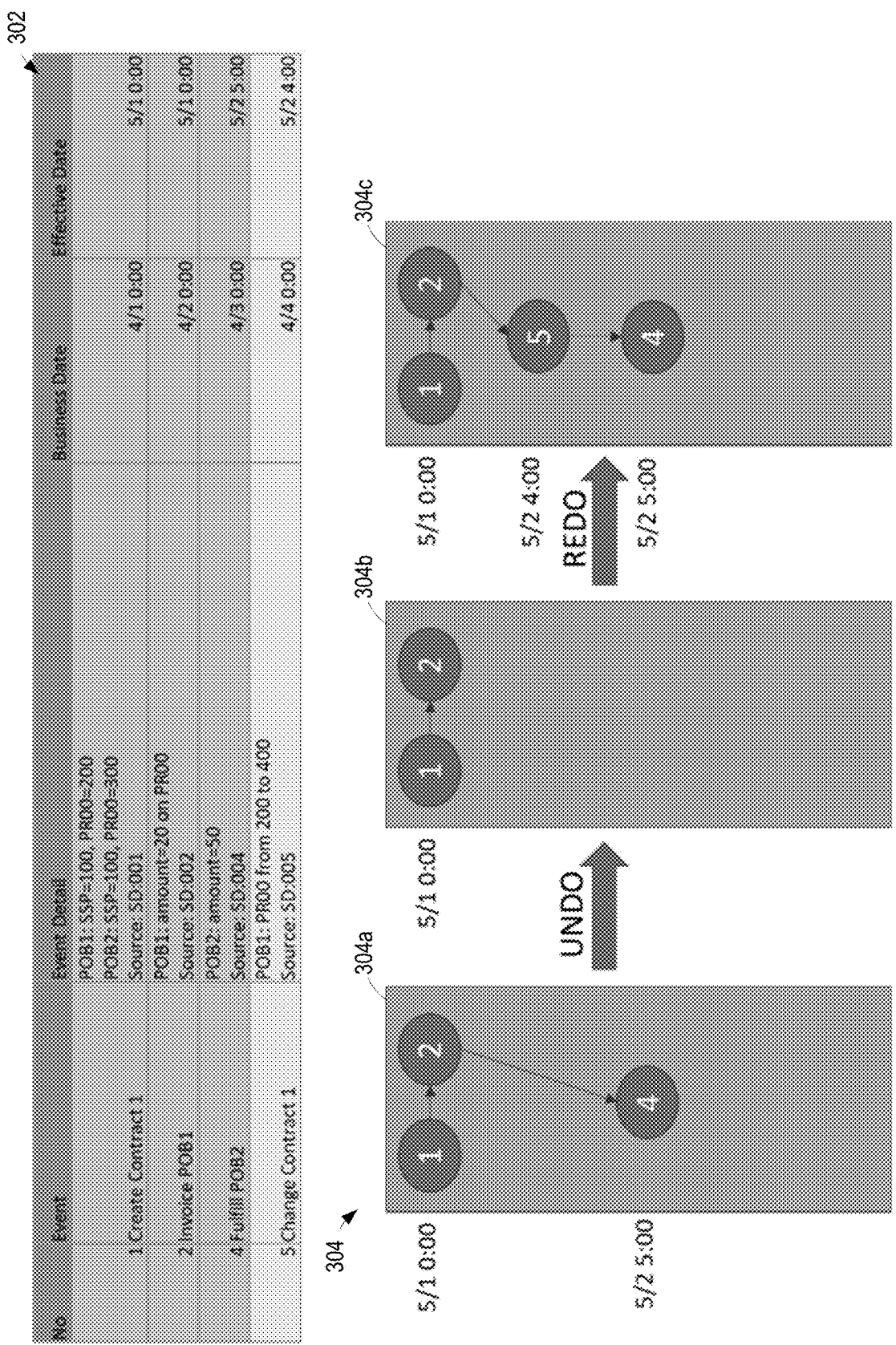
FIG. 3 is a schematic diagram of undo and redo operations as performed on recorded operational activity events.

Turning briefly to FIG. 3, a schematic diagram representing undo and redo operations is shown. A table 302 of example event data is shown in FIG. 3, which includes original events 1, 2, and 4 for creating a contract, invoicing a performance obligation (POB), and fulfilling a POB, respectively. The table 302 also includes a new event 5 for changing the contract created at event 1. The changing of the contract (e.g., to change a POB amount) effects the fulfillment of the contract (and has an earlier effective date than the fulfillment event 4), thus the change in contract may trigger an undo operation to undo the fulfillment event 4 and redo the fulfillment event 4 after changing the contract according to new event 5. This operation is schematically shown in the event mapping 304, where event mapping 304a shows the original events 1, 2, and 4 performed in sequential order as indicated by the arrows according to the respective effective dates of the events. Event mapping 304b shows the result of an undo operation to undo event 4 (e.g., event 4 is no longer shown in event mapping 304b). Event mapping 304c shows the result of a redo operation, in which event 4 is redone after processing event 5, leading to a new mapping of event 1, to event 2, to event 5, to event 4. In this way, the fulfillment may reflect the change to the POB amount specified by the change contract event.

Returning to FIG. 2, the method may further include outputting facts and/or results tables for presentation (e.g., display) to a user, as indicated at 216. In this way, a user may analyze the tables to trace operations of the organization.

Additional Example Scenarios

FIG. 4 shows an example table 400 of event data that includes various operational activities that are to be recorded in a traceable manner according to the methods and systems described herein (e.g., in accordance with the two-part model 100 of FIG. 1). FIGS. 5-11 show event mapping relating to the processing of the events of table 400. It is to be understood that the details in table 400 are provided to illustrate example mechanisms of the disclosed methods and systems, and additional or alternative events, event details, orders of events, effective/operation dates, and other parameters may be applied to the disclosed model for tracing operational activities in a similar manner.

As shown in table 400, a number of different events, relating to different contracts (e.g., Contract 1 and Contract 2) are shown, with respective operation dates (e.g., creation dates or dates at which the information is input into the system and/or dates at which an event occurs that triggers the input of related information into the system—for example, a creation of a sales order or a delivery of goods, also referred to as business dates) and effective dates (e.g., dates at which the events are respectively planned to take effect or occur). In the illustrated example, thirteen events are included in the table, with events 1, 2, 4, 5, 7, and 9 relating to Contract 1, events 3, 6, 8, 11, 12, and 13 relating to Contract 2, and event 10 relating to both Contracts 1 and 2.

Figure 5:
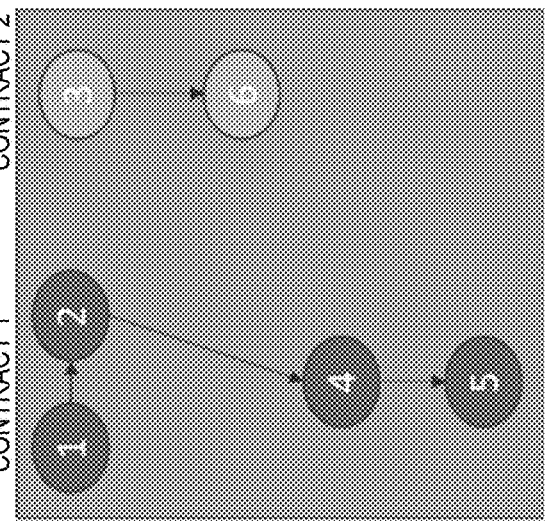
FIGS. 5-11 illustrate example workflows for processing events in the database table of FIG. 4.

FIG. 5 shows event mapping 500 of a first portion of the events of table 400 of FIG. 4 (e.g., the portion of events shown in table 400a of FIG. 5, which is a subset of table 400 of FIG. 4). The event mapping 500 may be determined based on a batch processing of events 1-6, in which the events are grouped by effective date and contract, as illustrated by the example table 16 below:

TABLE 16

Process sequence table based on grouping of events in table 400a of FIG. 5

| Process Sequence | Process Unit (Effective Date) | Event Group (Related Contract ID) | Events | Event No |
|---|---|---|---|---|
| 1 | PU_1 (May 1 0:00) | EvtGroup_1 (contract 1) | Create contract 1 | 1 |
|  |  |  | Invoice POB 1 | 2 |
|  |  | EvtGroup_2 (contract 2) | Create contract 2 | 3 |
| 2 | PU_2 (May 1 5:00) | EvtGroup_3 (contract 2) | Invoice POB3 | 6 |
| 3 | PU_3 (May 2 0:00) | EvtGroup_4 (contract 1) | Fulfill POB2 | 4 |
| 4 | PU_4 (May 3 9:00 AM) | EvtGroup_5 (contract 1) | Change contract 1 | 5 |

As shown, the event mapping 500 includes a first sequence of events relating to Contract 1 (e.g., events 1, 2, 4, and 5) and a second sequence of events relating to Contract 2 (e.g., events 3 and 6) arranged according to effective date (in the event mappings described herein the dates on the side of the mappings correspond to effective dates associated with that horizontal position in the event mapping diagram). For example, the effective date of creating Contract 1 (event 1), invoicing POB1 of contract 1 (event 2), and creating Contract 2 (event 3) are all the same, and occur before the other events. Thus, events 1, 2, and 3 are shown occurring at the same effective time. The next effective time represented in the table 400a is associated only with event 6 (invoicing POB3 of Contract 2), so this event is shown occurring before the remaining events (events 4 and 5) of Contract 1, and after event 3 (e.g., the prior Contract 2 event). Events 4 and 5 occur at progressively later effective times and are shown in such order in the Contract 1 flow portion of event mapping 500.

In response to processing the events according to event mapping 500, the following facts and results tables may be generated, as shown in Tables 17-25:

TABLE 17

Process Journal table of Facts part of model

| ProcessDate | Contract Id | Event No | Event Type | Event Source | Effective Date |
|---|---|---|---|---|---|
| June 10 5:00 | 1 | 1 | Contract Creation | SD:001 | May 1 0:00 |
| June 10 5:00 | 1 | 2 | Invoice | SD:002 | May 1 0:00 |
| June 10 5:00 | 2 | 3 | Contract Creation | SD:003 | May 1 0:00 |
| June 10 5:01 | 2 | 6 | Invoice | SD:006 | May 1 5:00 |
| June 10 5:02 | 1 | 4 | Fulfillment | SD:004 | May 2 0:00 |
| June 10 5:03 | 1 | 5 | Contract Change | SD:005 | May 2 5:00 |

TABLE 18

Event Element Contract table of Facts part of model

| Belonging Event ID | Contract Id | Attributes | ProcessDate |
|---|---|---|---|
| 1 | 1 | . . . | June 10 5:00 |
| 3 | 2 | . . . | June 10 5:00 |

TABLE 19

Event Element POB table of Facts part of model

| Belonging Event Id | PobId | Contract Id | SSP | Other Attributes | ProcessDate |
|---|---|---|---|---|---|
| 1 | POB1 | 1 | 100 | . . . | June 10 5:00 |
| 1 | POB2 | 1 | 100 | . . . | June 10 5:00 |
| 3 | POB3 | 2 | 50 | . . . | June 10 5:00 |
| 3 | POB4 | 2 | 50 | . . . | June 10 5:00 |

TABLE 20

Event Element Condition Type table of Facts part of model

| Belonging Event ID | PobId | Contract Id | Cond Type | Amount | Attributes | ProcessDate |
|---|---|---|---|---|---|---|
| 1 | POB1 | 1 | PR00 | 200 | . . . | June 10 5:00 |
| 1 | POB2 | 1 | PR00 | 300 | . . . | June 10 5:00 |
| 3 | POB3 | 2 | PR00 | 100 | . . . | June 10 5:00 |
| 3 | POB4 | 2 | PR00 | 200 | . . . | June 10 5:00 |
| 5 | POB1 | 1 | PR00 | 400 | . . . | June 10 5:03 |

TABLE 21

Invoice Events table of Facts part of model

| Belonging Event ID | PobId | Contract Id | Cond Type | Amount | Attributes | ProcessDate |
|---|---|---|---|---|---|---|
| 2 | POB1 | 1 | PR00 | 20 | | June 10 5:00 |
| 6 | POB3 | 2 | PR00 | 10 | | June 10 5:01 |

TABLE 22

Fulfillment Events table of Facts part of model

| Belonging Event ID | PobId | Contract Id | Amount | Attributes | ProcessDate |
|---|---|---|---|---|---|
| 4 | POB2 | 1 | 50 | | 6/10 5:02 |

TABLE 23

Contract table of Results part of model

| ProcessDate | Contract Id | Attributes |
|---|---|---|
| 6/10 5:00 | 1 | ... |
| 6/10 5:00 | 2 | ... |

TABLE 24

POB table of Results part of model

| ProcessDate | Contract Id | PobID | SSP | Attributes |
|---|---|---|---|---|
| 6/10 5:00 | 1 | POB1 | 100 | ... |
| 6/10 5:00 | 1 | POB2 | 100 | ... |
| 6/10 5:00 | 2 | POB3 | 50 | ... |
| 6/10 5:00 | 2 | POB4 | 50 | ... |

TABLE 25

Condition Type Details table of Results part of model

| ProcessDate | PobId | Contract Id | Cond Type | Amount | Invoiced Amt | Invoice Delta Amt | Recog Rev | Recog Delta Rev |
|---|---|---|---|---|---|---|---|---|
| June 10 5:00 | POB1 | 1 | PR00 | 200 | 20 | 20 | 0 | 0 |
| June 10 5:00 | POB1 | 1 | CORR | 0 | 0 | 0 | 0 | 0 |
| June 10 5:00 | POB2 | 1 | PR00 | 300 | 0 | 0 | 0 | 0 |
| June 10 5:00 | POB2 | 1 | CORR | 0 | 0 | 0 | 0 | 0 |
| June 10 5:00 | POB3 | 2 | PR00 | 100 | 0 | 0 | 0 | 0 |
| June 10 5:00 | POB3 | 2 | CORR | 0 | 0 | 0 | 0 | 0 |
| June 10 5:00 | POB4 | 2 | PR00 | 200 | 0 | 0 | 0 | 0 |
| June 10 5:00 | POB4 | 2 | CORR | 0 | 0 | 0 | 0 | 0 |
| June 10 5:01 | POB3 | 2 | PR00 | 100 | 10 | 10 | 0 | 0 |
| June 10 5:02 | POB2 | 1 | PR00 | 300 | 0 | 0 | 50 | 50 |
| June 10 5:03 | POB1 | 1 | PR00 | 400 | 20 | 20 | 0 | 0 |

Figure 6:
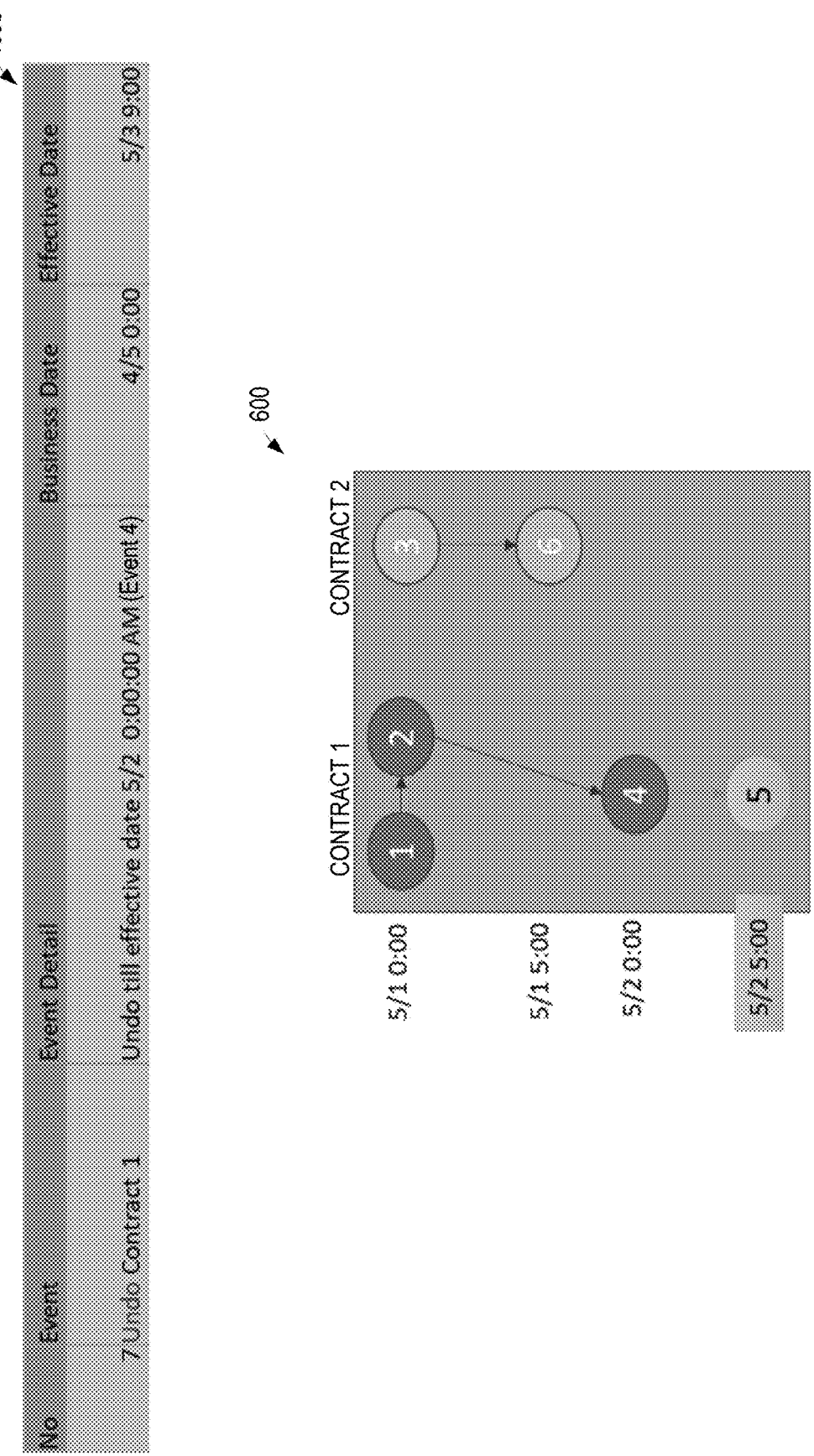

FIG. 6 shows event mapping 600 of a second portion of events from table of FIG. 4 (e.g., the portion of events shown in table 400b of FIG. 6, which is a subset of table 400 of FIG. 4). The event mapping 600 may be determined based on a processing of event 7, which is triggered from a UI or API call (e.g., user-requested). As shown, event 7 corresponds to an undo action to undo Contract 1 events until effective date 5/2 and 0:00:00 AM. Since the undo action provides only an effective date parameter, the processing of the undo action results in the undoing of event 5, which is the only event in the illustrated example thus far (e.g., prior to the effective date of event 7) that has an effective date of 5/2 0:00:00 AM or later (for example, the effective date of event 5 is 5/2 5:00 AM, whereas the next latest event, event 4, has an effective date of 5/2 0:00, which is not after 5/2 0:00:00 AM). The undo operation results in changes to the process journal table of the facts part of the model, as shown in Table 26 below, and a new facts table (an undo events table) is added as shown in Table 27 below. The undo operation also causes a change in the condition type details table of the results part of the model, as shown in Table 28 below.

TABLE 26

Updated Process Journal table of Facts part of model

| ProcessDate | Contract Id | Event No | Event Type | Event Source | Effective Date |
|---|---|---|---|---|---|
| 6/10 5:00 | 1 | 1 | Contract Creation | SD:001 | 5/1 0:00 |
| 6/10 5:00 | 1 | 2 | Invoice | SD:002 | 5/1 0:00 |
| 6/10 5:00 | 2 | 3 | Contract Creation | SD:003 | 5/1 0:00 |
| 6/10 5:01 | 2 | 6 | Invoice | SD:006 | 5/1 5:00 |
| 6/10 5:02 | 1 | 4 | Fulfillment | SD:004 | 5/2 0:00 |
| 6/10 5:03 | 1 | 5 | Contract Change | SD:005 | 5/2 5:00 |
| 6/11 7:02 | 1 | 7 | Undo | UI:Jack | 5/3 9:00 |

TABLE 27

Undo Events table of Facts part of model

| Belonging Event ID | Undo Till | Contract Id | ProcessDate |
|---|---|---|---|
| 7 | 5/2 00:00 | 1 | 6/11 7:02 |

TABLE 28

Updated Condition Type Details table of Results part of model

| ProcessDate | PobId | Contract Id | Cond Type | Amount | Invoiced Amt | Invoice Delta Amt | Recog Rev | Recog Delta Rev |
|---|---|---|---|---|---|---|---|---|
| June 10 5:00 | POB1 | 1 | PR00 | 200 | 20 | 20 | 0 | 0 |
| June 10 5:00 | POB1 | 1 | CORR | 0 | 0 | 0 | 0 | 0 |
| June 10 5:00 | POB2 | 1 | PR00 | 300 | 0 | 0 | 0 | 0 |
| June 10 5:00 | POB2 | 1 | CORR | 0 | 0 | 0 | 0 | 0 |
| June 10 5:00 | POB3 | 2 | PR00 | 100 | 0 | 0 | 0 | 0 |
| June 10 5:00 | POB3 | 2 | CORR | 0 | 0 | 0 | 0 | 0 |
| June 10 5:00 | POB4 | 2 | PR00 | 200 | 0 | 0 | 0 | 0 |
| June 10 5:00 | POB4 | 2 | CORR | 0 | 0 | 0 | 0 | 0 |
| June 10 5:01 | POB3 | 2 | PR00 | 100 | 10 | 10 | 0 | 0 |
| June 10 5:02 | POB2 | 1 | PR00 | 300 | 0 | 0 | 50 | 50 |
| June 10 5:03 | POB1 | 1 | PR00 | 400 | 20 | 20 | 0 | 0 |
| June 11 7:02 | POB1 | 1 | PR00 | 200 | 20 | 20 | 0 | 0 |

Figure 7:
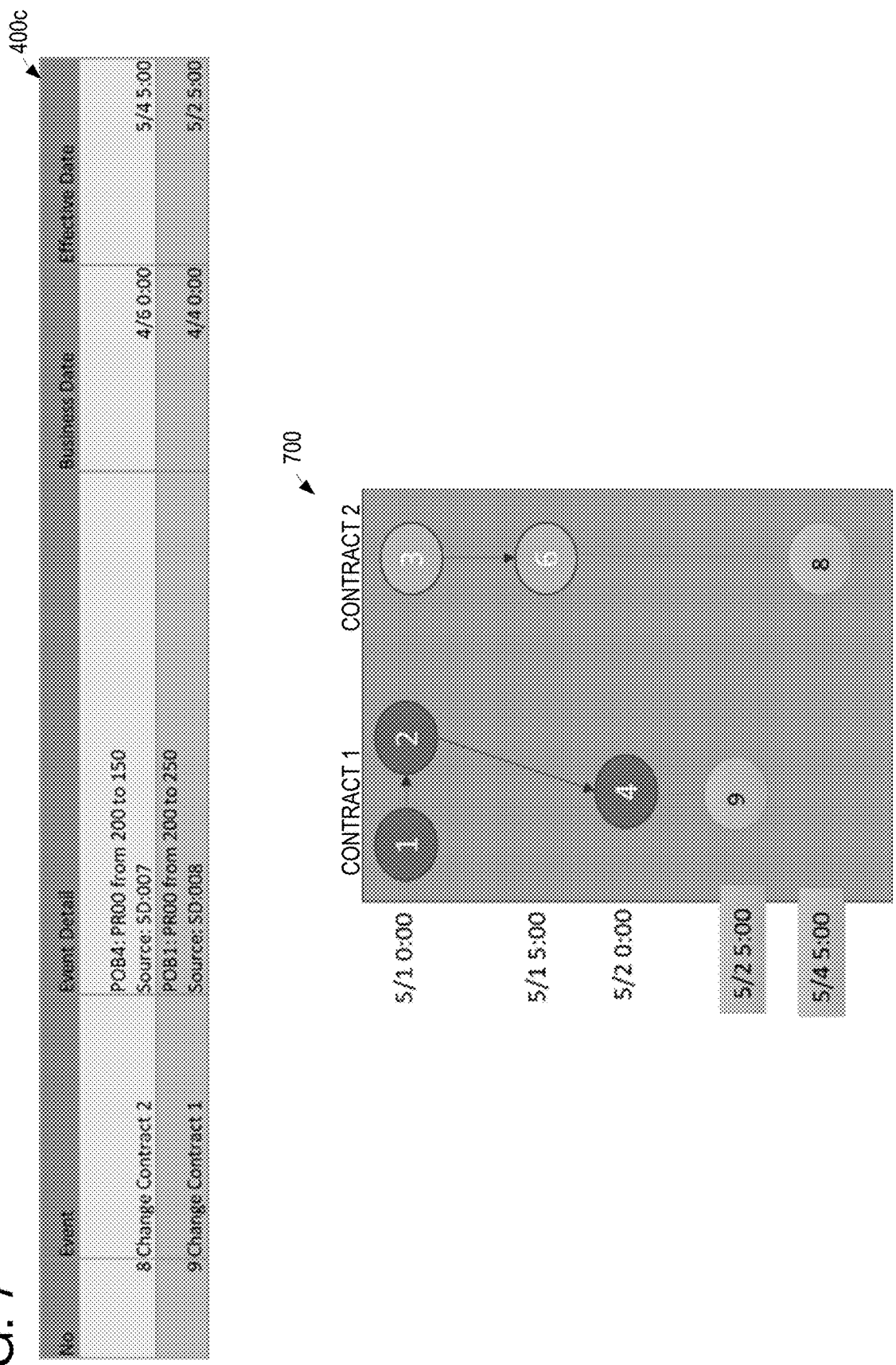

FIG. 7 shows event mapping 700 of a third portion of events from table of FIG. 4 (e.g., the portion of events shown in table 400c of FIG. 7, which is a subset of table 400 of FIG. 4). The event mapping 700 may be determined based on a batch processing of events 8 and 9. As shown, events 8 and 9 corresponds to changes in Contracts 1 and 2. The events 8 and 9 are added to respective workflows in event mapping 700 (e.g., event 9 relates to Contract 1 and is thus added under event 4, while event 8 relates to Contract 2 and is thus added under event 6) according to their respective effective dates. The change operation results in changes to the process journal table of the facts part of the model, as shown in Table 29 below, and to the event element condition type table of the Facts part of the model, as shown in Table 30 below. The change operation also causes changes to the condition type details table of the Results part of the mode, as shown in Table 31 below.

TABLE 29

Updated Process Journal table of Facts part of model

| ProcessDate | Contract Id | Event No | Event Type | Event Source | Effective Date |
|---|---|---|---|---|---|
| 6/10 5:00 | 1 | 1 | Contract Creation | SD:001 | 5/1 0:00 |
| 6/10 5:00 | 1 | 2 | Invoice | SD:002 | 5/1 0:00 |
| 6/10 5:00 | 2 | 3 | Contract Creation | SD:003 | 5/1 0:00 |

TABLE 29-continued

Updated Process Journal table of Facts part of model

| ProcessDate | Contract Id | Event No | Event Type | Event Source | Effective Date |
|---|---|---|---|---|---|
| 6/10 5:01 | 2 | 6 | Invoice | SD:006 | 5/1 5:00 |
| 6/10 5:02 | 1 | 4 | Fulfillment | SD:004 | 5/2 0:00 |
| 6/10 5:03 | 1 | 5 | Contract Change | SD:005 | 5/2 5:00 |
| 6/11 7:02 | 1 | 7 | Undo | UI:Jack | 5/3 9:00 |
| 6/12 4:00 | 1 | 9 | Contract Change | SD:008 | 5/2 5:00 |
| 6/12 4:03 | 2 | 8 | Contract Change | SD:007 | 5/4 5:00 |

TABLE 30

Updated Event Element Condition Type table of Facts part of model

| Belonging Event ID | PobId | Contract Id | Cond Type | Amount | Attributes | ProcessDate |
|---|---|---|---|---|---|---|
| 1 | POB1 | 1 | PR00 | 200 | . . . | June 10 5:00 |
| 1 | POB2 | 1 | PR00 | 300 | . . . | June 10 5:00 |
| 3 | POB3 | 2 | PR00 | 100 | . . . | June 10 5:00 |
| 3 | POB4 | 2 | PR00 | 200 | . . . | June 10 5:00 |
| 5 | POB1 | 1 | PR00 | 400 | . . . | June 10 5:03 |
| 9 | POB1 | 1 | PR00 | 250 | . . . | June 12 4:00 |
| 8 | POB4 | 2 | PR00 | 150 | . . . | June 12 4:03 |

Updated Condition Type Details table of Results part of model

| ProcessDate | PobId | Contract Id | Cond Type | Amount | Invoiced Amt | Invoice Delta Amt | Recog Rev | Recog Delta Rev |
|---|---|---|---|---|---|---|---|---|
| June 10 5:00 | POB1 | 1 | PR00 | 200 | 20 | 20 | 0 | 0 |
| June 10 5:00 | POB1 | 1 | CORR | 0 | 0 | 0 | 0 | 0 |
| June 10 5:00 | POB2 | 1 | PR00 | 300 | 0 | 0 | 0 | 0 |
| June 10 5:00 | POB2 | 1 | CORR | 0 | 0 | 0 | 0 | 0 |
| June 10 5:00 | POB3 | 2 | PR00 | 100 | 0 | 0 | 0 | 0 |
| June 10 5:00 | POB3 | 2 | CORR | 0 | 0 | 0 | 0 | 0 |
| June 10 5:00 | POB4 | 2 | PR00 | 200 | 0 | 0 | 0 | 0 |
| June 10 5:00 | POB4 | 2 | CORR | 0 | 0 | 0 | 0 | 0 |
| June 10 5:01 | POB3 | 2 | PR00 | 100 | 10 | 10 | 0 | 0 |

-continued

Updated Condition Type Details table of Results part of model

| ProcessDate | PobId | Contract Id | Cond Type | Amount | Invoiced Amt | Invoice Delta Amt | Recog Rev | Recog Delta Rev |
|---|---|---|---|---|---|---|---|---|
| June 10 5:02 | POB2 | 1 | PR00 | 300 | 0 | 0 | 50 | 50 |
| June 10 5:03 | POB1 | 1 | PR00 | 400 | 20 | 20 | 0 | 0 |
| June 11 7:02 | POB1 | 1 | PR00 | 200 | 20 | 20 | 0 | 0 |
| June 12 4:00 | POB1 | 1 | PR00 | 250 | 20 | 20 | 0 | 0 |
| June 12 4:03 | POB4 | 2 | PR00 | 150 | 0 | 0 | 0 | 0 |

Figure 8:
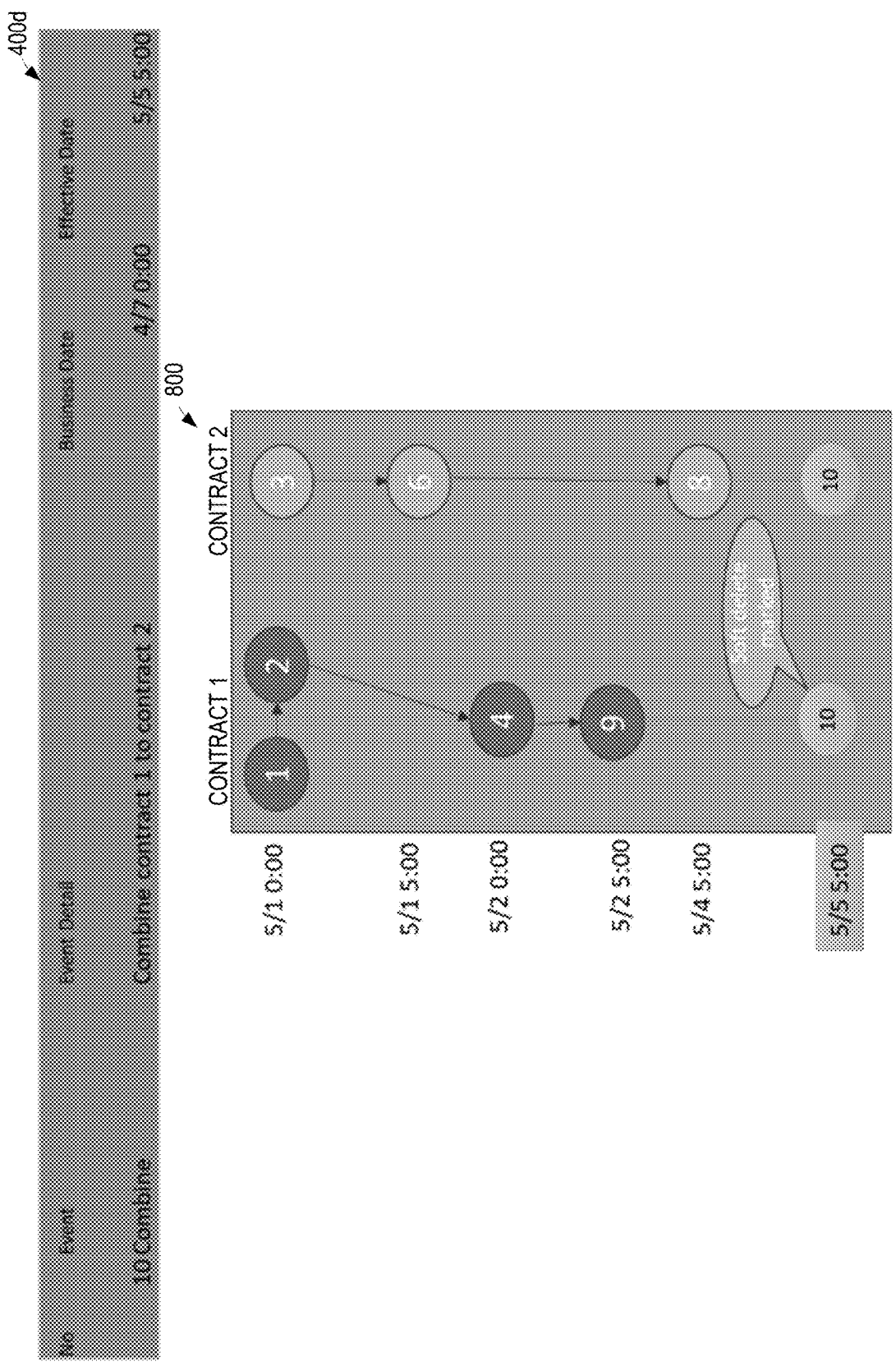

FIG. 8 shows event mapping 800 of a fourth portion of events from table of FIG. 4 (e.g., the portion of events shown in table 400d of FIG. 8, which is a subset of table 400 of FIG. 4). The event mapping 800 may be determined based on a processing of event 10, which is triggered from a UI or API call (e.g., user-requested). As shown, event 10 corresponds to combine action to combine Contract 1 to Contract 2. The event 10 is added to each of the workflows in event mapping 800 (e.g., since it relates to both Contracts) according to the respective effective date of event 10. A soft delete indicator may be added to the addition of event 10 to one of the contract workflows (e.g., the workflow for Contract 1) since the event will actually only be processed once. The combine operation results in changes to the process journal table of the facts part of the model, as shown in Table 32 below, and causes a new table for Combination Events for the facts part of the model to be created, as shown in Table 33 below. The combine operation also causes changes to the contract table, POB table, and condition type details table of the Results part of the mode, as shown in Tables 34-36 below.

TABLE 32

Updated Process Journal table of Facts part of model

| ProcessDate | Contract Id | Event No | Event Type | Event Source | Effective Date |
|---|---|---|---|---|---|
| 6/10 5:00 | 1 | 1 | Contract Creation | SD:001 | 5/1 0:00 |
| 6/10 5:00 | 1 | 2 | Invoice | SD:002 | 5/1 0:00 |
| 6/10 5:00 | 2 | 3 | Contract Creation | SD:003 | 5/1 0:00 |
| 6/10 5:01 | 2 | 6 | Invoice | SD:006 | 5/1 5:00 |
| 6/10 5:02 | 1 | 4 | Fulfillment | SD:004 | 5/2 0:00 |
| 6/10 5:03 | 1 | 5 | Contract Change | SD:005 | 5/2 5:00 |
| 6/11 7:02 | 1 | 7 | Undo | UI:Jack | 5/3 9:00 |
| 6/12 4:00 | 1 | 9 | Contract Change | SD:008 | 5/2 5:00 |
| 6/12 4:03 | 2 | 8 | Contract Change | SD:007 | 5/4 5:00 |
| 6/13 2:13 | 1 | 10 | Contract Combine | UI:Jack | 5/5 5:00 |
| 6/13 2:13 | 2 | 10 | Contract Combine | UI:Jack | 5/5 5:00 |

TABLE 33

Combination Events table of Facts part of model

| Belonging Event ID | Source | Target | ProcessDate |
|---|---|---|---|
| 10 | 1 | 2 | 6/13 2:13 |

TABLE 34

Updated Contract table of Results part of model

| ProcessDate | Contract Id | Attributes | Soft Delete |
|---|---|---|---|
| 6/10 5:00 | 1 | ... | |
| 6/10 5:00 | 2 | ... | |
| 6/13 2:13 | 1 | ... | X |

TABLE 35

Updated POB table for Results part of model

| ProcessDate | Contract Id | PobID | SSP | Attributes | Soft-Delete |
|---|---|---|---|---|---|
| 6/10 5:00 | 1 | POB1 | 100 | ... | |
| 6/10 5:00 | 1 | POB2 | 100 | ... | |
| 6/10 5:00 | 2 | POB3 | 50 | ... | |
| 6/10 5:00 | 2 | POB4 | 50 | ... | |
| 6/13 2:13 | 1 | POB1 | 100 | ... | X |
| 6/13 2:13 | 1 | POB2 | 100 | ... | X |
| 6/13 2:13 | 2 | POB1 | 100 | ... | |
| 6/13 2:13 | 2 | POB2 | 100 | ... | |

TABLE 36

Updated Condition Type Details table for Results part of model

| ProcessDate | PobId | Contract Id | Cond Type | Amount | Invoiced Amt | Invoice Delta Amt | Recog Rev | Recog Delta Rev | Soft Delete |
|---|---|---|---|---|---|---|---|---|---|
| June 10 5:00 | POB1 | 1 | PR00 | 200 | 20 | 20 | 0 | 0 | |
| June 10 5:00 | POB1 | 1 | CORR | 0 | 0 | 0 | 0 | 0 | |
| June 10 5:00 | POB2 | 1 | PR00 | 300 | 0 | 0 | 0 | 0 | |
| June 10 5:00 | POB2 | 1 | CORR | 0 | 0 | 0 | 0 | 0 | |
| June 10 5:00 | POB3 | 2 | PR00 | 100 | 0 | 0 | 0 | 0 | |
| June 10 5:00 | POB3 | 2 | CORR | 0 | 0 | 0 | 0 | 0 | |
| June 10 5:00 | POB4 | 2 | PR00 | 200 | 0 | 0 | 0 | 0 | |
| June 10 5:00 | POB4 | 2 | CORR | 0 | 0 | 0 | 0 | 0 | |
| June 10 5:01 | POB3 | 2 | PR00 | 100 | 10 | 10 | 0 | 0 | |
| June 10 5:02 | POB2 | 1 | PR00 | 300 | 0 | 0 | 50 | 50 | |
| June 10 5:03 | POB1 | 1 | PR00 | 400 | 20 | 20 | 0 | 0 | |
| June 11 7:02 | POB1 | 1 | PR00 | 200 | 20 | 20 | 0 | 0 | |

TABLE 36-continued

Updated Condition Type Details table for Results part of model

| ProcessDate | PobId | Contract Id | Cond Type | Amount | Invoiced Amt | Invoice Delta Amt | Recog Rev | Recog Delta Rev | Soft Delete |
|---|---|---|---|---|---|---|---|---|---|
| June 12 4:00 | POB1 | 1 | PR00 | 250 | 20 | 20 | 0 | 0 | |
| June 12 4:03 | POB4 | 2 | PR00 | 150 | 0 | 0 | 0 | 0 | |
| June 13 2:13 | POB1 | 1 | PR00 | 250 | 20 | 20 | 0 | 0 | X |
| June 13 2:13 | POB2 | 1 | PR00 | 300 | 0 | 0 | 50 | 50 | X |
| June 13 2:13 | POB1 | 1 | CORR | 0 | 0 | 0 | 0 | 0 | X |
| June 13 2:13 | POB2 | 1 | CORR | 0 | 0 | 0 | 0 | 0 | X |
| June 13 2:13 | POB1 | 2 | PR00 | 250 | 20 | 20 | 0 | 0 | |
| June 13 2:13 | POB1 | 2 | CORR | 16 | 0 | 0 | 0 | 0 | |
| June 13 2:13 | POB2 | 2 | PR00 | 300 | 0 | 0 | 50 | 50 | |
| June 13 2:13 | POB2 | 2 | CORR | −14 | 0 | 0 | 0 | 0 | |
| June 13 2:13 | POB3 | 2 | CORR | 14 | 0 | 0 | 0 | 0 | |
| June 13 2:13 | POB4 | 2 | CORR | −16 | 0 | 0 | 0 | 0 | |

Figure 9:
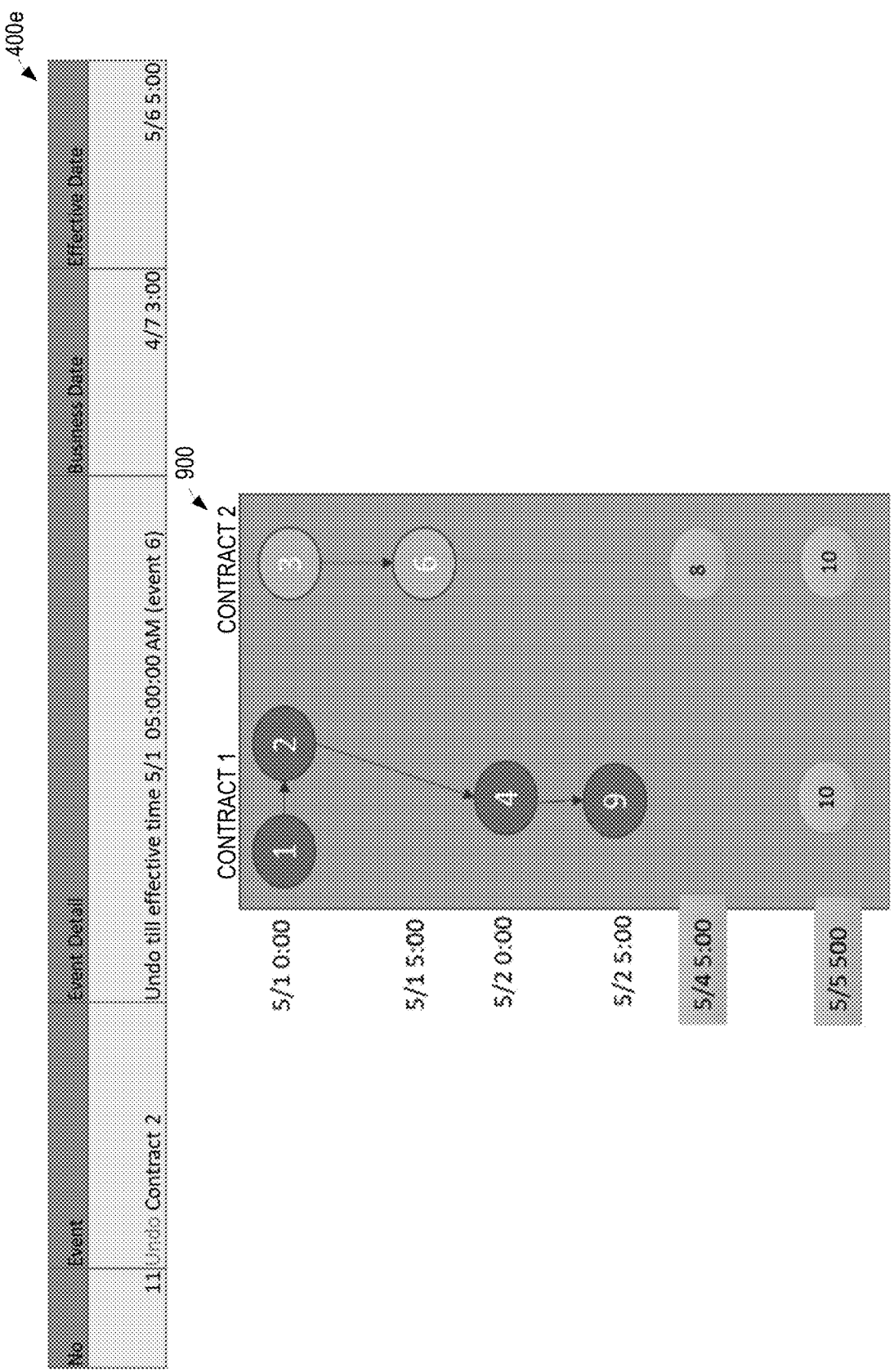

FIG. 9 shows event mapping 900 of a fifth portion of events from table of FIG. 4 (e.g., the portion of events shown in table 400e of FIG. 9, which is a subset of table 400 of FIG. 4). The event mapping 900 may be determined based on a processing of event 11, which is triggered from a UI or API call (e.g., user-requested). As shown, event 11 corresponds to an undo action to undo Contract 2 events until effective date 5/1 at 05:00:00 AM and event 6. Thus, the processing of the undo action results in the undoing of events occurring after event 6, which includes the contract combine operation described above with respect to FIG. 8. Accordingly, even though the undo operation is associated with Contract 2, the prior combination of the Contracts causes the side effect of an additional application of the undo operation to relevant events in the Contract 1 workflow. As a result, the events 8 and 10 in the event mapping 900 are slated for undoing. Events 4 and 9 are not undone, even though they have effective dates after the targeted effective date, because they are solely Contract 1 events and not tied to Contract 2 as specified by the undo operation. The undo operation results in changes to the process journal table and the undo events table of the facts part of the model, as shown in Tables 37 and 38 below. The undo operation also causes changes in the contract table, POB table, and condition type details table of the results part of the model, as shown in Tables 39-41 below.

TABLE 37

Updated Process Journal table of Facts part of model

| ProcessDate | Contract Id | Event No | Event Type | Event Source | Effective Date |
|---|---|---|---|---|---|
| 6/10 5:00 | 1 | 1 | Contract Creation | SD:001 | 5/1 0:00 |
| 6/10 5:00 | 1 | 2 | Invoice | SD:002 | 5/1 0:00 |
| 6/10 5:00 | 2 | 3 | Contract Creation | SD:003 | 5/1 0:00 |
| 6/10 5:01 | 2 | 6 | Invoice | SD:006 | 5/1 5:00 |
| 6/10 5:02 | 1 | 4 | Fulfillment | SD:004 | 5/2 0:00 |
| 6/10 5:03 | 1 | 5 | Contract Change | SD:005 | 5/2 5:00 |
| 6/11 7:02 | 1 | 7 | Undo | UI:Jack | 5/3 9:00 |
| 6/12 4:00 | 1 | 9 | Contract Change | SD:008 | 5/2 5:00 |
| 6/12 4:03 | 2 | 8 | Contract Change | SD:007 | 5/4 5:00 |
| 6/13 2:13 | 1 | 10 | Contract Combine | UI:Jack | 5/5 5:00 |
| 6/13 2:13 | 2 | 10 | Contract Combine | UI:Jack | 5/5 5:00 |
| 6/14 3:01 | 2 | 11 | Undo | UI:Jack | 5/6 5:00 |
| 6/14 3:01 | 1 | 11 | Undo | Side Effect of Event 11 | 5/6 5:00 |

TABLE 38

Updated Undo Events table of Facts part of model

| Belonging Event ID | Undo Till | Contract Id | ProcessDate |
|---|---|---|---|
| 7 | 5/2 00:00 | 1 | 6/11 7:02 |
| 11 | 5/1 05:00 | 2 | 6/14 3:01 |
| 11 | 5/2 05:00 | 1 | 6/14 3:01 |

TABLE 39

Updated Contract table of Results part of model

| ProcessDate | Contract Id | Attributes | Soft Delete |
|---|---|---|---|
| 6/10 5:00 | 1 | . . . | |
| 6/10 5:00 | 2 | . . . | |
| 6/13 2:13 | 1 | . . . | X |
| 6/14 3:01 | 1 | . . . | |
| 6/14 3:01 | 2 | . . . | |

TABLE 40

Updated POB table of Results part of model

| ProcessDate | Contract Id | PobID | SSP | Attributes | Soft Delete |
|---|---|---|---|---|---|
| 6/10 5:00 | 1 | POB1 | 100 | . . . | |
| 6/10 5:00 | 1 | POB2 | 100 | . . . | |
| 6/10 5:00 | 2 | POB3 | 50 | . . . | |
| 6/10 5:00 | 2 | POB4 | 50 | . . . | |
| 6/13 2:13 | 1 | POB1 | 100 | . . . | X |
| 6/13 2:13 | 1 | POB2 | 100 | . . . | X |
| 6/13 2:13 | 2 | POB1 | 100 | . . . | |
| 6/13 2:13 | 2 | POB2 | 100 | . . . | |
| 6/14 3:01 | 1 | POB1 | 100 | . . . | |
| 6/14 3:01 | 1 | POB2 | 100 | . . . | |
| 6/14 3:01 | 2 | POB3 | 50 | . . . | |
| 6/14 3:01 | 2 | POB4 | 50 | . . . | |

TABLE 41

Updated Condition Type Details table of Results part of model

| ProcessDate | PobId | Contract Id | Cond Type | Amount | Invoiced Amt | Invoice Delta Amt | Recog Rev | Recog Delta Rev | Soft Delete |
|---|---|---|---|---|---|---|---|---|---|
| June 10 5:00 | POB1 | 1 | PR00 | 200 | 20 | 20 | 0 | 0 | |
| June 10 5:00 | POB1 | 1 | CORR | 0 | 0 | 0 | 0 | 0 | |
| June 10 5:00 | POB2 | 1 | PR00 | 300 | 0 | 0 | 0 | 0 | |
| June 10 5:00 | POB2 | 1 | CORR | 0 | 0 | 0 | 0 | 0 | |
| June 10 5:00 | POB3 | 2 | PR00 | 100 | 0 | 0 | 0 | 0 | |
| June 10 5:00 | POB3 | 2 | CORR | 0 | 0 | 0 | 0 | 0 | |
| June 10 5:00 | POB4 | 2 | PR00 | 200 | 0 | 0 | 0 | 0 | |
| June 10 5:00 | POB4 | 2 | CORR | 0 | 0 | 0 | 0 | 0 | |
| June 10 5:01 | POB3 | 2 | PR00 | 100 | 10 | 10 | 0 | 0 | |
| June 10 5:02 | POB2 | 1 | PR00 | 300 | 0 | 0 | 50 | 50 | |
| June 10 5:03 | POB1 | 1 | PR00 | 400 | 20 | 20 | 0 | 0 | |
| June 11 7:02 | POB1 | 1 | PR00 | 200 | 20 | 20 | 0 | 0 | |
| June 12 4:00 | POB1 | 1 | PR00 | 250 | 20 | 20 | 0 | 0 | |
| June 12 4:03 | POB4 | 2 | PR00 | 150 | 0 | 0 | 0 | 0 | |
| June 13 2:13 | POB1 | 1 | PR00 | 250 | 20 | 20 | 0 | 0 | X |
| June 13 2:13 | POB2 | 1 | PR00 | 300 | 0 | 0 | 50 | 50 | X |
| June 13 2:13 | POB1 | 1 | CORR | 0 | 0 | 0 | 0 | 0 | X |
| June 13 2:13 | POB2 | 1 | CORR | 0 | 0 | 0 | 0 | 0 | X |
| June 13 2:13 | POB1 | 2 | PR00 | 250 | 20 | 20 | 0 | 0 | |
| June 13 2:13 | POB1 | 2 | CORR | 16 | 0 | 0 | 0 | 0 | |
| June 13 2:13 | POB2 | 2 | PR00 | 300 | 0 | 0 | 50 | 50 | |
| June 13 2:13 | POB2 | 2 | CORR | −14 | 0 | 0 | 0 | 0 | |
| June 13 2:13 | POB3 | 2 | CORR | 14 | 0 | 0 | 0 | 0 | |
| June 13 2:13 | POB4 | 2 | CORR | −16 | 0 | 0 | 0 | 0 | |
| June 14 3:01 | POB1 | 1 | PR00 | 250 | 20 | 20 | 0 | 0 | |
| June 14 3:01 | POB2 | 1 | PR00 | 300 | 0 | 0 | 50 | 50 | |
| June 14 3:01 | POB2 | 1 | CORR | 0 | 0 | 0 | 0 | 0 | |
| June 14 3:01 | POB1 | 1 | CORR | 0 | 0 | 0 | 0 | 0 | |
| June 14 3:01 | POB3 | 2 | PR00 | 100 | 10 | 10 | 0 | 0 | |
| June 14 3:01 | POB4 | 2 | CORR | 0 | 0 | 0 | 0 | 0 | |
| June 14 3:01 | POB4 | 2 | PR00 | 200 | 0 | 0 | 0 | 0 | |
| June 14 3:01 | POB3 | 2 | CORR | 0 | 0 | 0 | 0 | 0 | |

Figure 10:
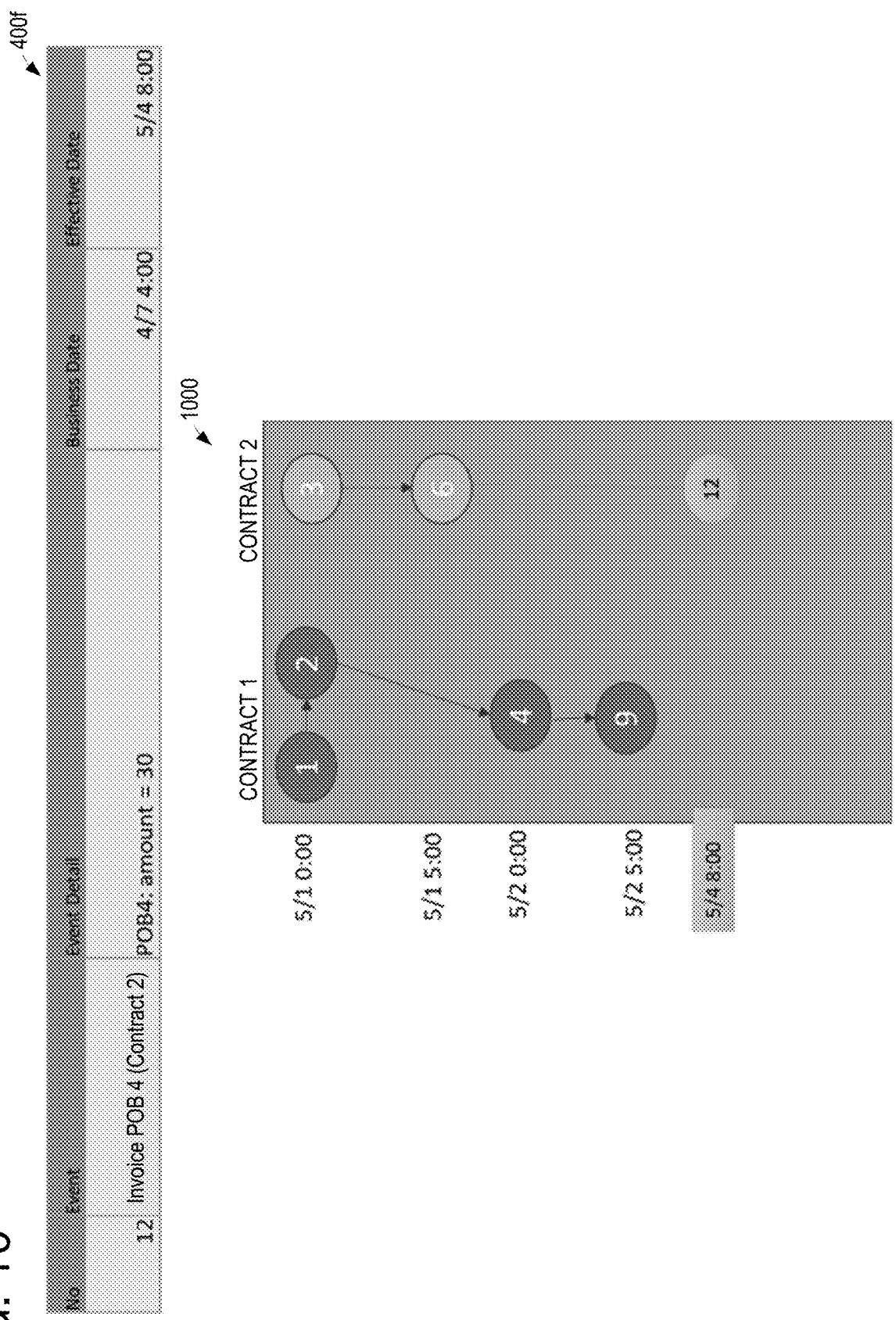

FIG. 10 shows event mapping 1000 of a sixth portion of events from table of FIG. 4 (e.g., the portion of events shown in table 400f of FIG. 10, which is a subset of table 400 of FIG. 4). The event mapping 1000 may be determined based on a batch processing of event 12. As shown, event 12 corresponds to a generation of an invoice for POB4 (which is related to Contract 2). Thus, the processing of the invoice action results in the addition of event 12 to the Contract 2 workflow in the event mapping 1000, at the associated effective date (which is after the effective date of event 6 in the Contract 2 workflow).

Figure 11:
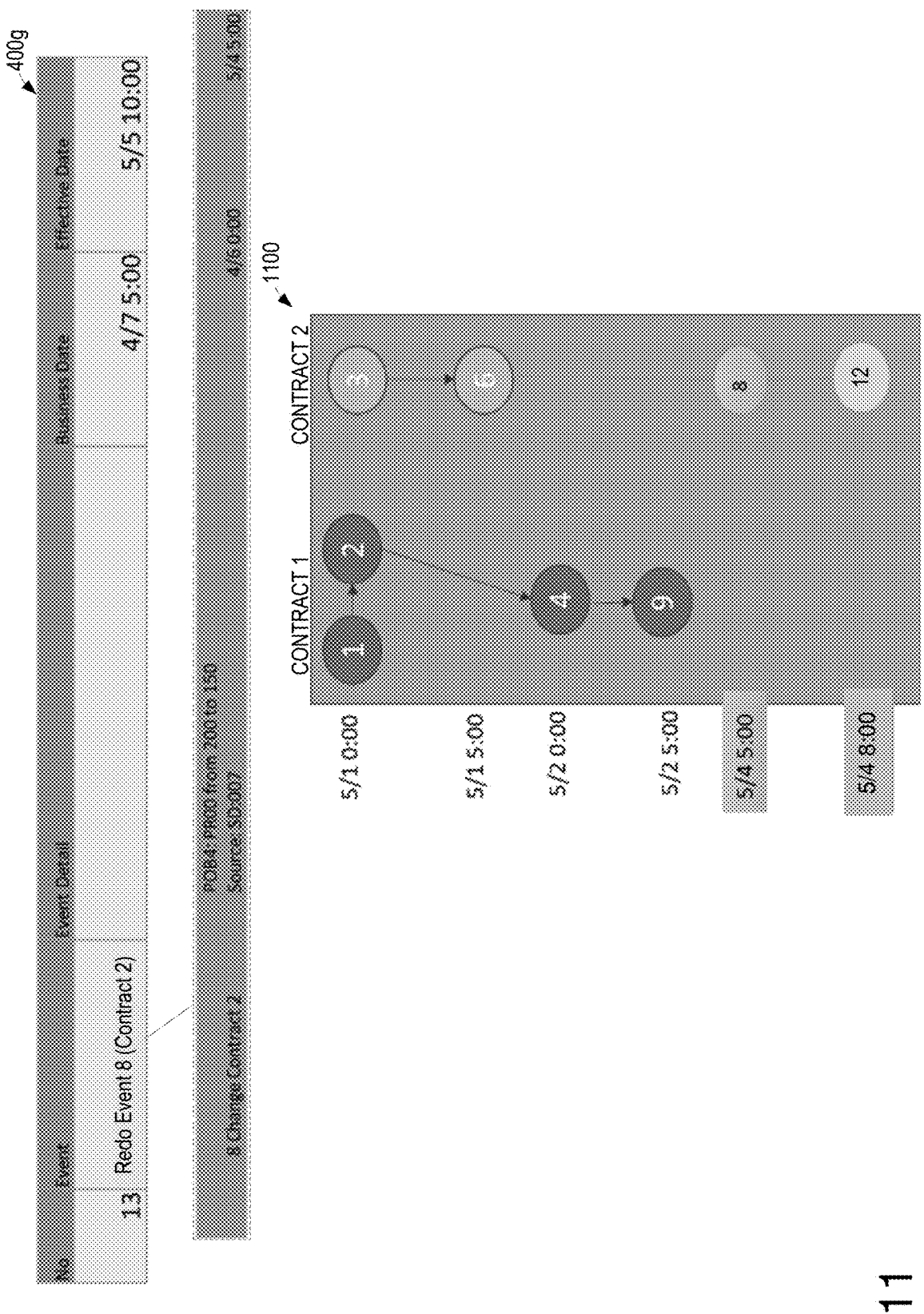

FIG. 11 shows event mapping 1100 of a seventh portion of events from table of FIG. 4 (e.g., the portion of events shown in table 400g of FIG. 11, which is a subset of table 400 of FIG. 4). The event mapping 1100 may be determined based on a processing of event 13, which is triggered from a UI or API call (e.g., user-requested). As shown, event 13 corresponds to a redo action targeting a redo of event 8 (e.g., a change in Contract 2). Since event 8 was previously undone (with the undo action described with respect to FIG. 9), and has an effective date prior to event 12 the operation of the redo action causes the event 12 to be undone, then the event 8 to be redone, then the event 12 to be redone, resulting in the workflow shown at 1100.

Example Advantages

Accordingly, the above disclosure provides systems and methods that allow users to record every operational activity from the process to results. These activities may be logged according to timestamps and thus create a time tunnel, allowing users to trace back each process and result of operational activities. In addition, users can undo actions until a specific timestamp in the system, so that to avoid any results caused by wrong actions or system bugs. The undo choice also makes the system more user friendly. Since each process and result can be recorded in the system, the disclosed systems and methods add value to an organization's system in that an entire organization's process can be tested before the system goes to production. The event journal records every process that the system makes, so that it can be tested whether test cases are fully covered and the system behaves as expected. When the system goes to production (e.g., after testing), accountants or other operators can use the disclosed methods and systems to trace every operational activity of an organization and the results intuitively, so that information such as capital flow can be traced and analysis of the organization may be performed more accurately relative to systems that do not incorporate the technologies described herein.

Since user behaviors are recorded in detail in the system, the system can, in some examples, be incorporated with big data analysis, artificial intelligence, and/or machine learning to guide user behaviors, provide user preferences (e.g., automatically), and achieve intelligent enterprise. Further advantages may be achieved relating to the correction of data using the described systems and methods. For example, when data errors occur due to system bugs, developers may attempt to analyze data, trace out route causes, and write additional code to restore the data to an non-error state. With the help of the data model that supports tracing back activities and undo actions, as described herein, the data can be restored more efficiently relative to other systems. Example operations to restore data using the disclosed systems and methods includes having organization personnel analyze data errors, and using the disclosed system to find system bugs and fix the system bugs, perform undo processes until a last correct event, and redo processes that have been undone in the fixed system. In this way, the disclosed system may eliminate the need to rewrite the code to correct the data, resulting in a more economic and efficient system.

A Generalized Computer Environment

Figure 12:
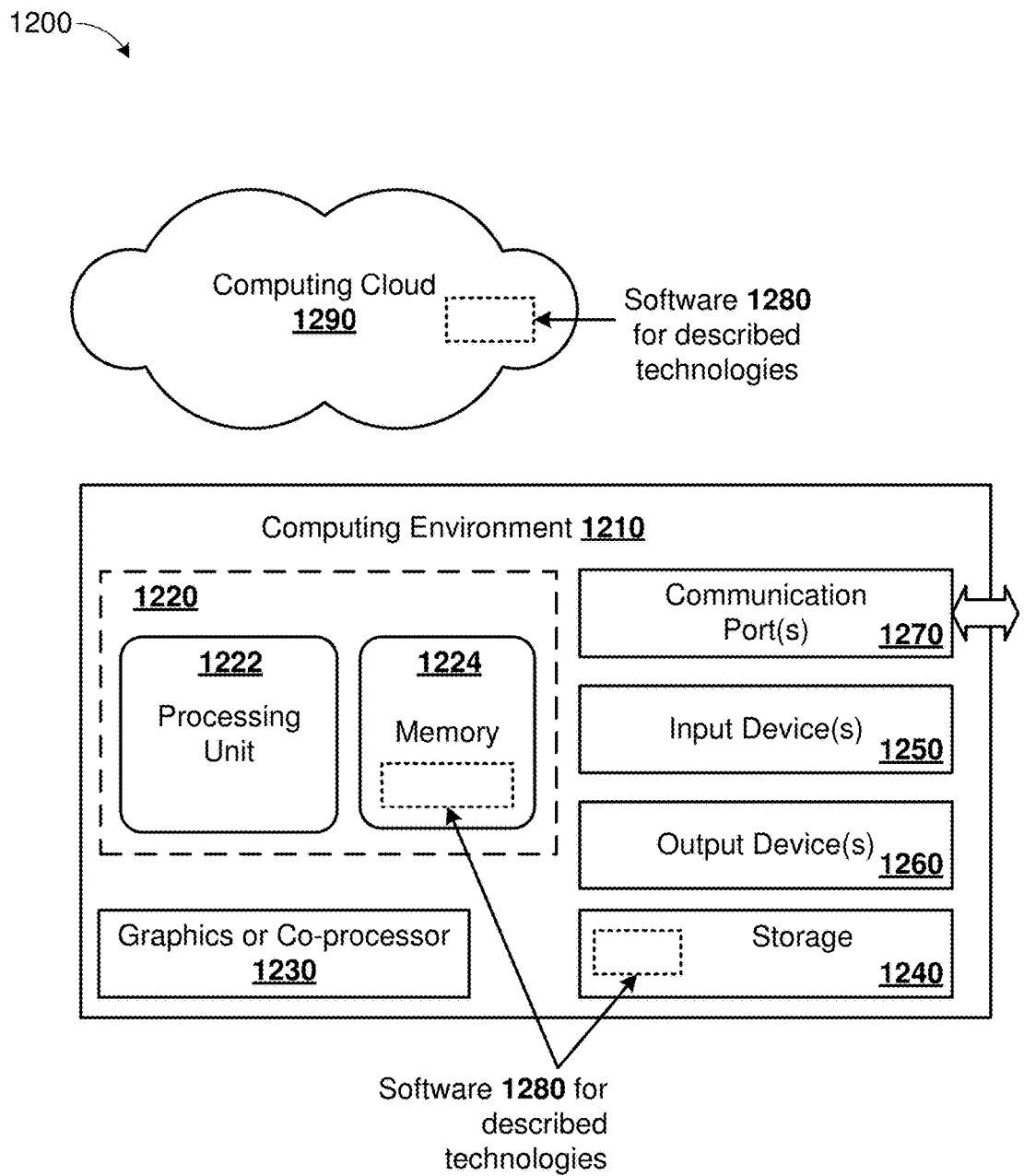
FIG. 12 is a diagram schematically depicting a computing environment suitable for implementation of disclosed technologies.

FIG. 12 illustrates a generalized example of a suitable computing system 1200 in which described examples, techniques, and technologies, including construction, deployment, operation, query processing, and maintenance of a composite graph data structure or dynamic rooted trees according to disclosed technologies can be implemented. The computing system 1200 is not intended to suggest any limitation as to scope of use or functionality of the present disclosure, as the innovations can be implemented in diverse general-purpose or special-purpose computing systems.

With reference to FIG. 12, computing environment 1210 includes one or more processing units 1222 and memory 1224. In FIG. 12, this basic configuration 1220 is included within a dashed line. Processing unit 1222 executes computer-executable instructions, such as for implementing any of the methods or objects described herein for performing queries on a composite graph data structure representing a dynamic system, or various other architectures, components, handlers, managers, modules, or services described herein. Processing unit 1222 can be a general-purpose central processing unit (CPU), a processor in an application-specific integrated circuit (ASIC), or any other type of processor. In a multi-processing system, multiple processing units execute computer-executable instructions to increase processing power. For example, the processing unit 1222 may be configured to perform parallel operations for different operational activities (e.g., processing at least some of the contract 1 events and contract 2 events in parallel in the above-described examples). Computing environment 1210 can also include a graphics processing unit or co-processing unit 1230. Tangible memory 1224 can be volatile memory (e.g., registers, cache, or RAM), non-volatile memory (e.g., ROM, EEPROM, or flash memory), or some combination thereof, accessible by processing units 1222, 1230. The memory 1224 stores software 1280 implementing one or more innovations described herein, in the form of computer-executable instructions suitable for execution by the processing unit(s) 1222, 1230. The memory 1224 can also store a composite graph data structure, including nodes, edges, and their respective attributes; a table or other data structure indicating states of a modeled system, configuration data, UI displays, browser code, data structures including data tables, working tables, change logs, output structures, input fields, output fields, data values, indices, or flags, as well as other operational data.

A computing system 1210 can have additional features, such as one or more of storage 1240, input devices 1250, output devices 1260, or communication ports 1270. An interconnection mechanism (not shown) such as a bus, controller, or network interconnects the components of the computing environment 1210. Typically, operating system software (not shown) provides an operating environment for other software executing in the computing environment 1210, and coordinates activities of the components of the computing environment 1210.

The tangible storage 1240 can be removable or non-removable, and includes magnetic disks, magnetic tapes or cassettes, CD-ROMs, DVDs, or any other medium which can be used to store information in a non-transitory way and which can be accessed within the computing environment 1210. The storage 1240 stores instructions of the software 1280 (including instructions and/or data) implementing one or more innovations described herein.

The input device(s) 1250 can be a mechanical, touch-sensing, or proximity-sensing input device such as a keyboard, mouse, pen, touchscreen, trackball, a voice input device, a scanning device, or another device that provides input to the computing environment 1210. The output device(s) 1260 can be a display, printer, speaker, optical disk writer, or another device that provides output from the computing environment 1210.

The communication port(s) 1270 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1200 can also include a computing cloud 1290 in which instructions implementing all or a portion of the disclosed technology are executed. Any combination of memory 1224, storage 1240, and computing cloud 1290 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, software objects, classes, components, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

FIG. 13 depicts an example cloud computing environment 1300 in which the described technologies can be implemented. The cloud computing environment 1300 comprises a computing cloud 1390 containing resources and providing services. The computing cloud 1390 can comprise various types of cloud computing resources, such as computer servers, data storage repositories, networking resources, and so forth. The computing cloud 1390 can be centrally located (e.g., provided by a data center of an organization or other entity) or distributed (e.g., provided by various computing resources located at different locations, such as different data centers and/or located in different cities or countries). It is to be understood that the example cloud computing environment 1300 is one example environment in which the described technologies can be implemented, and other environments may be used in addition or alternatively to the example cloud computing environment.

The computing cloud 1390 can be operatively connected to various types of computing devices (e.g., client computing devices), such as computing devices 1312, 1314, and 1316, and can provide a range of computing services thereto. One or more of computing devices 1312, 1314, and 1316 can be computers (e.g., servers, virtual machines, embedded systems, desktop, or laptop computers), mobile devices (e.g., tablet computers, smartphones, or wearable appliances), or other types of computing devices. Communication links between computing cloud 1390 and computing devices 1312, 1314, and 1316 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 1312, 1314, and 1316 can also be connected to each other.

Computing devices 1312, 1314, and 1316 can utilize the computing cloud 1390 to obtain computing services and perform computing operations (e.g., data processing, data storage, and the like). Particularly, software 1380 for performing the described innovative technologies can be resident or executed in the computing cloud 1390, in computing devices 1312, 1314, and 1316, or in a distributed combination of cloud and computing devices.

In one example, the cloud computing environment 1300 may optionally include an orchestrator device 1318, which may include a computing device that stores a journal table (e.g., an example of the journal table 110 of FIG. 1 and/or any of the example journal tables described herein) and/or serves as a configuration component (e.g., an example of configuration component 108 of FIG. 1). In such an example, the software 1380 of the orchestrator device 1318 may additionally include instructions executable to locate resources within the distributed cloud environment 1300 to populate the journal table and/or perform other operations described herein. For example, the different Facts and/or Results tables described herein may be distributed across computing devices of the cloud environment 1300 and/or in respective computing devices of the cloud environment 1300 and the orchestrator device 1318 may be configured to access and/or control maintenance of the tables.

In additional or alternative examples, the cloud environment 1300 may include multiple computing clouds 1390. In such examples, the same data may be stored redundantly within two different computing clouds for replication, in order to increase the availability of the overall system.

General Considerations

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and does not exclude the presence of intermediate elements between the coupled items. Furthermore, as used herein, the terms "or" and "and/or" mean any one item or combination of items in the phrase.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 12, computer-readable storage media include memory 1224, and storage 1240. The term computer-readable storage media does not include signals and carrier waves. In addition, the term computer-readable storage media does not include communication ports (e.g., 1270) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, Angular, Basic, C, C++, C #, Curl, Dart, Fortran, Go, Java, JavaScript, Julia, Lisp, Matlab, Octave, Pascal, Perl, PHP, Python, R, Ruby, SAS, SPSS, Visual Basic, WebAssembly, Whitespace, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer-implemented method comprising:
receiving input of event data for events associated with operational activities, the event data including, for each of the events, a time parameter and a subject of the respective event;
determining an event mapping for the events by grouping the events based on the time parameter or the subject of each of the events and further by processing the events in an order based on the time parameter or the subject of each of the events, wherein each of the events is associated with a respective process date;
in response to processing the events according to the event mapping, transforming an input data structure of the event data to fit a model data structure by populating database tables in each of a first part and a second part of a model with event entries corresponding to the event data, each of the event entries including the respective process date of a corresponding event,
wherein the first part of the model comprises one or more tables configured to store information from the event data corresponding to processing of the operational activities associated with each of the event entries and the second part of the model comprises one or more tables configured to store information from the event data corresponding to results of the processing of the operational activities associated with each of the event entries,
wherein corresponding event entries stored in the first part and the second part of the model are linked by the respective process dates for the events,
wherein the respective process dates for the events are included in the database tables of the first part and the second part of the model in respective process date fields, and
wherein, for each event entry in the tables of the first and second parts of the model, the respective process date indicates a respective time at which the processing of the operational activities associated with the event entry is performed;
in response to receiving a request to perform an operation associated with the events:
updating a first event entry for the events in the database tables of the first part of the model, and
correspondingly updating a second event entry for the events in the database tables of the second part of the model that has a same respective process date as the first event entry; and
outputting one or more of the database tables of the model for presentation to a user.

2. The computer-implemented method of claim 1, wherein the time parameter is an effective date of the respective event, and wherein the effective date indicates a scheduled time at which the respective event is scheduled to be processed.

3. The computer-implemented method of claim 1, wherein the subject of the respective event is a contract identifier corresponding to a contract associated with the respective event.

4. The computer-implemented method of claim 1, wherein the database tables of the first part of the model include a process journal table and a plurality of additional database tables, and wherein the journal table is populated with information that is stored in the plurality of additional database tables.

5. The computer-implemented method of claim 4, wherein the model further includes a configuration part that stores event detail mapping data that maps fields of the journal table to one or more respective database tables of the plurality of additional database tables.

6. The computer-implemented method of claim 1, further comprising receiving a request to undo one or more selected events and, responsive to the request, performing an undo action on the one or more selected events.

7. The computer-implemented method of claim 6, wherein the request includes a targeted time parameter, wherein the time parameters of the events are compared to the targeted time parameter to identify the one or more selected events, and wherein the respective time parameter of each of the one or more selected events is later than the targeted time parameter.

8. The computer-implemented method of claim 6, wherein performing the undo action on the one or more selected events includes identifying a last event having a last process date that is before an earliest process date of the one or more selected events and storing a new record in a selected database table of the second part of the model, the new record having an associated process date corresponding to the undo action and related data associated with the last event, wherein the associated process date of the new record is set to the last process date of the last event.

9. The computer-implemented method of claim 1, further comprising receiving a request to redo a selected event and, responsive to the request, performing a redo action on the selected event.

10. The computer-implemented method of claim 9, wherein performing the redo action on the selected event comprises performing an undo action on each event in that has an effective date after an effective date of the selected event prior to reperforming a process associated with the selected event.

11. The computer-implemented method of claim 9, wherein a new record associated with the request to redo the selected event is stored as an event entry in one or more of the populated database tables.

12. One or more non-transitory computer-readable media storing instructions which, when executed by one or more hardware processors, cause the hardware processors to perform actions comprising:
receiving, from a data source, event data for an event associated with operational activities of an organization, the event data including a time parameter and a subject of the event;
processing the event in accordance with the time parameter of the event, wherein the event is assigned an effective date that corresponds to a scheduled time at which the event is scheduled to be processed, and a process date that corresponds to a time at which the event is processed;
transforming, using a model, a data structure of the event data for storage in an activity database by storing, based on event detail mapping data for a model data structure, the event data and the process date for the event in each of:
a first plurality of database tables included in a first, process tracking part of the model configured to track respective processes for the event by storing the process date and information from the event data corresponding to processing of the operational activities associated with the event, and
a second plurality of database tables included in a second, results part of the model configured to track respective results of performing the respective processes for the event by storing the process date and information from the event data corresponding to results of the processing of the operational activities associated with the event, wherein the process date is used to map entries in the results part of the model to corresponding entries in the process tracking part of the model;
receiving an indication of a targeted event for an undo action, the targeted event including one of a plurality of events stored in the first and second plurality of database tables;
performing the undo action on a subset of the plurality of events, the subset being stored in the first and second plurality of database tables before the targeted event, wherein performing the undo action includes modifying a first event entry in the first plurality of database tables corresponding to the subset of the plurality of events and correspondingly modifying a second event entry in the second plurality of database tables corresponding to the subset of the plurality of events that has a same respective process date as the first event entry or performing the undo action based on a respective effective date of the targeted event; and
outputting one or more of the first plurality of database tables for presentation to a user.

13. The one or more non-transitory computer-readable media of claim 12, wherein the first plurality of database tables includes entries for other events associated with the subject, and wherein the actions further comprise receiving a request to perform the undo action on the targeted event, and performing the undo action on the targeted event and each event included in the first plurality of database tables that is associated with the subject and that has an associated effective date after the respective effective date of the targeted events.

14. The one or more non-transitory computer-readable media of claim 13, wherein the request is received via a user interface or an Application Programming Interface (API) call.

15. The one or more non-transitory computer-readable media of claim 13, wherein the undo action is stored in at least one of the first plurality of database tables and at least one of the second plurality of database tables as a new event entry.

16. The one or more non-transitory computer-readable media of claim 12, wherein processing the event in accordance with the time parameter of the event comprises processing the event in an order relative to other events based on the time parameter.

17. A system comprising:
one or more hardware processors with memory coupled thereto;
computer-readable media storing instructions executable by the one or more hardware processors, the instructions comprising:
first instructions to receive event data for a plurality of events associated with operational activities of an organization, the event data including a respective effective date and a respective subject of each event of the plurality of events;
second instructions to determine an event mapping for the plurality of events by grouping and performing a batch processing of the plurality of events, wherein the plurality of events are grouped based on the respective effective dates and the respective subjects of the plurality of events and processed in an order that is based on the respective effective dates and the respective subjects of the plurality of events, wherein, for each respective event of the plurality of events, the respective effective date indicates a scheduled time at which the respective event is scheduled to be processed, and wherein each event of the plurality of events is associated with a process date corresponding to a time at which the respective event is processed;
third instructions to transform an input data structure of the event data to fit a model data structure by storing, for each event of the plurality of events responsive to processing the plurality of events according to the event mapping, the event data and the process date for the event in a respective entry in each of: a journal table of a first, process tracking part of a model configured to track processes for the event by storing information from the event data corresponding to processing of the operational activities associated with each of the plurality of events, and a results table corresponding to a second, results part of the model configured to track results of performing the processes for the event at the time corresponding to the process date by storing information from the event data corresponding to results of the processing of the operational activities associated with each of the plurality of events, wherein each entry in the journal table and the results table includes the process date for the respective event of that entry;
fourth instructions to, responsive to receiving a request to perform an operation associated with one or more of the plurality of events, update a first event entry for the plurality of events in the journal table and to correspondingly update a second event entry for the plurality of events in the results table that has a same respective process date as the first event entry; and fifth instructions to output at least the journal table for presentation to a user.

18. The system of claim 17, wherein the operation includes undoing one or more of the events, redoing one or more of the events, or combining one or more subjects associated with the events.

19. The system of claim 17, wherein updating the journal table and the results table includes adding at least one new entry in each of the journal table and the results table corresponding to the operation.

* * * * *